US006264293B1

United States Patent
Musselman et al.

(10) Patent No.: US 6,264,293 B1
(45) Date of Patent: Jul. 24, 2001

(54) TRACTION STUD MOUNT AND METHOD OF MANUFACTURING AND MOUNTING

(75) Inventors: James Musselman; Robert Musselman; Mark Musselman, all of Hope, MI (US)

(73) Assignee: International Engineering & Manufacturing Inc, Hope, MI (US)

( * ) Notice: Subject to any disclaimer, the term of this patent is extended or adjusted under 35 U.S.C. 154(b) by 0 days.

(21) Appl. No.: 09/325,658

(22) Filed: Jun. 4, 1999

(51) Int. Cl.[7] .................................................. B62D 55/26
(52) U.S. Cl. .................................................. 305/178
(58) Field of Search ................................. 305/160, 161, 305/162, 165, 167, 171, 174, 178, 180, 179, 168, 166

(56) References Cited

U.S. PATENT DOCUMENTS

| 2,025,999 | 12/1935 | Myers | 305/10 |
|---|---|---|---|
| 2,338,819 | 1/1944 | Mayne et al. | 305/10 |
| 3,436,128 | 4/1969 | Boulanger | 305/38 |
| 3,582,155 | 6/1971 | Marier | 305/38 |
| 3,779,617 | * 12/1973 | Palmaer | 305/180 |
| 3,838,894 | * 10/1974 | Reedy | 305/180 |
| 3,883,190 | 5/1975 | Kilbane, Jr. | 305/35 |
| 3,934,943 | 1/1976 | Gage | 305/35 |
| 3,973,808 | 8/1976 | Janssen et al. | 305/54 |
| 4,154,488 | * 5/1979 | Svensson et al. | 305/180 |
| 4,217,006 | 8/1980 | Dehnert | 305/35 |
| 4,469,379 | 9/1984 | Kotyuk, Jr. | 305/35 |
| 4,844,562 | 7/1989 | Ranner | 305/56 |
| 5,676,437 | * 10/1997 | Holmgren et al. | 305/180 |
| 5,921,642 | * 7/1999 | Tschida | 305/180 |

FOREIGN PATENT DOCUMENTS

| 1073505 | * 3/1980 | (CA) | 305/168 |
|---|---|---|---|
| 1078717 | * 8/1967 | (GB) | 305/160 |

* cited by examiner

*Primary Examiner*—S. Joseph Morano
*Assistant Examiner*—Long Bao Nguyen
(74) *Attorney, Agent, or Firm*—John J. Swartz

(57) ABSTRACT

A one-piece stud mount for mounting a traction stud on a reinforcing rod adapted to be embedded in a yieldable drive track. The stud mount includes an elongated, stud receiving receptacle having a threaded opening therein for threadedly receiving a traction stud and a transversely disposed head defining an aperture which has a shape complemental to the shape of the rod for slidably receiving the rod prior to the molding of the track. The invention contemplates a method of manufacturing the stud mount and mounting the stud mount on a track reinforcing bar. The invention also contemplates a method of manufacturing a track in which the stud mount is embedded after being mounted on a reinforcing rod which is also embedded in the track.

162 Claims, 7 Drawing Sheets

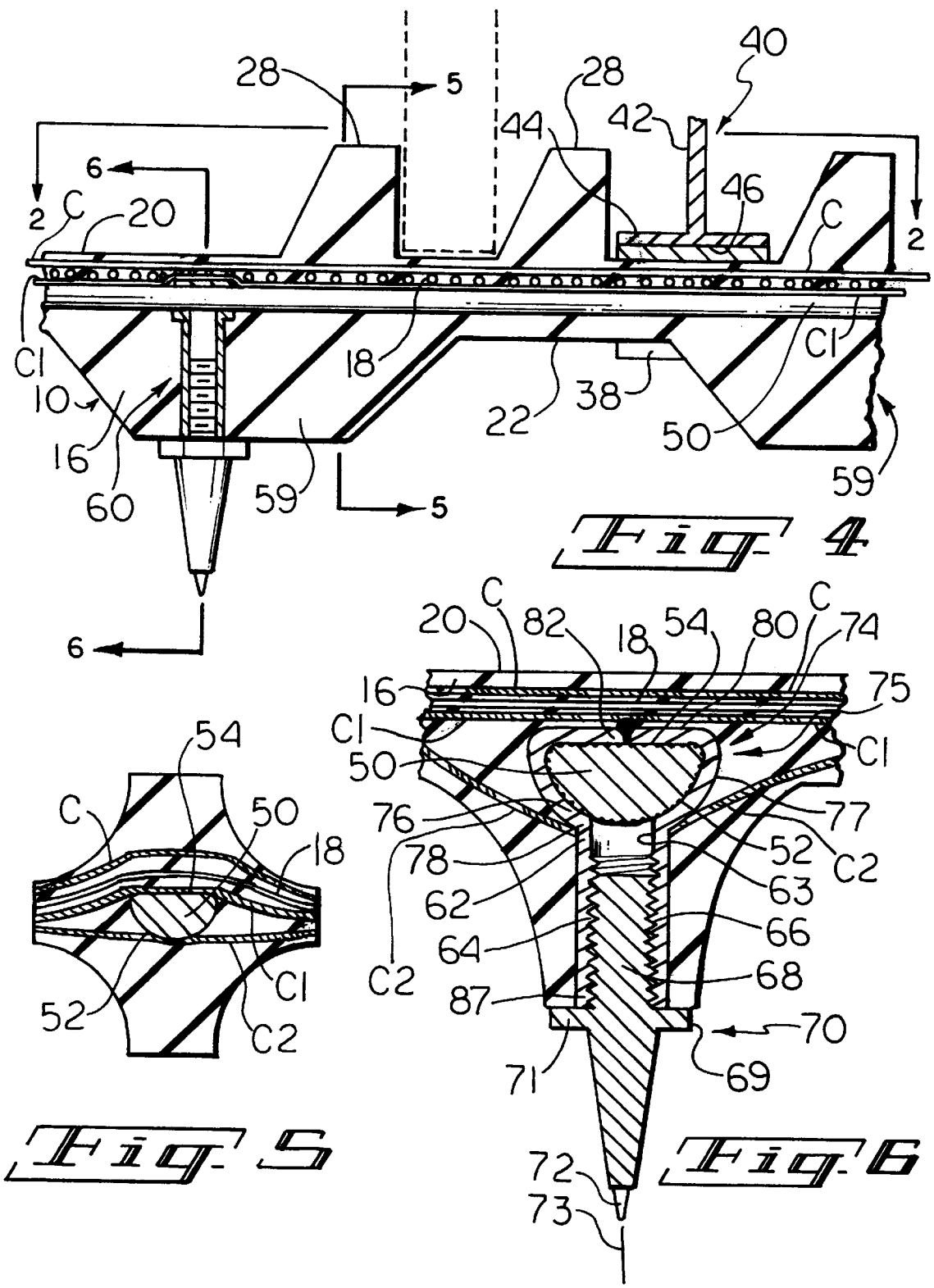

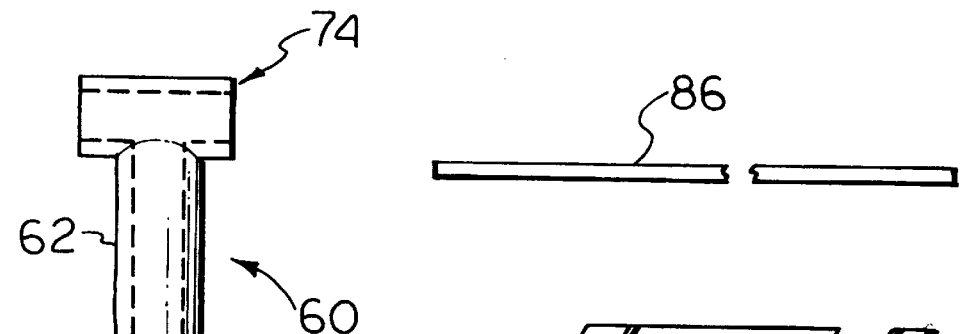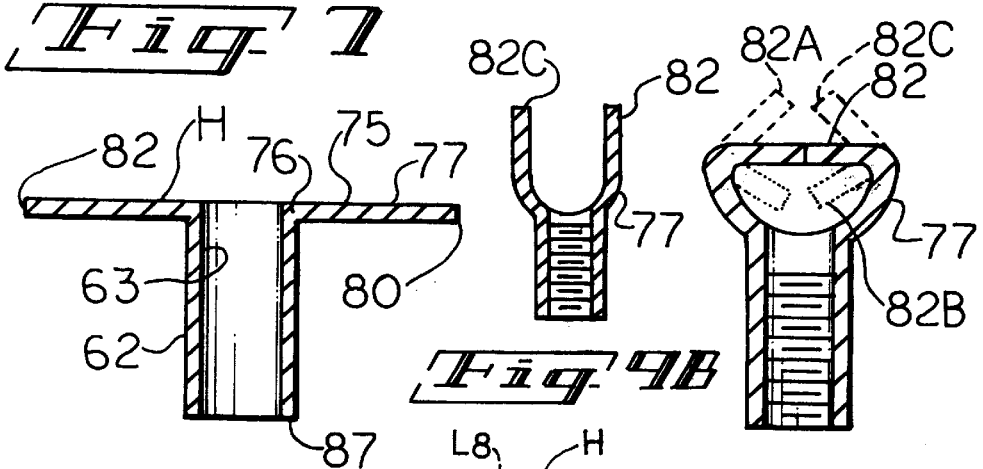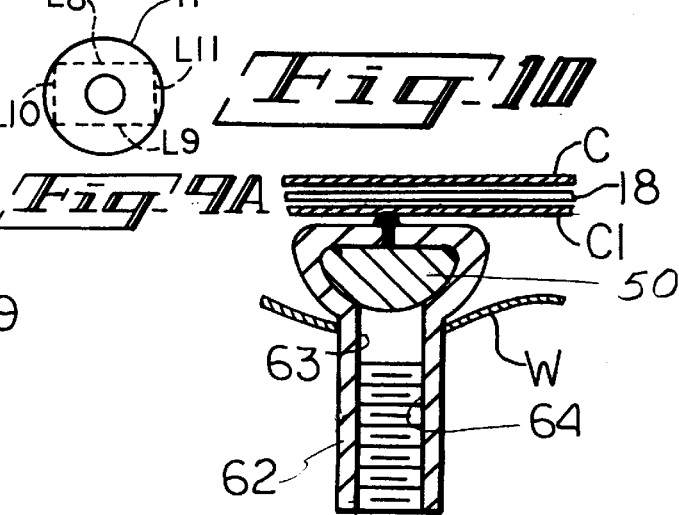

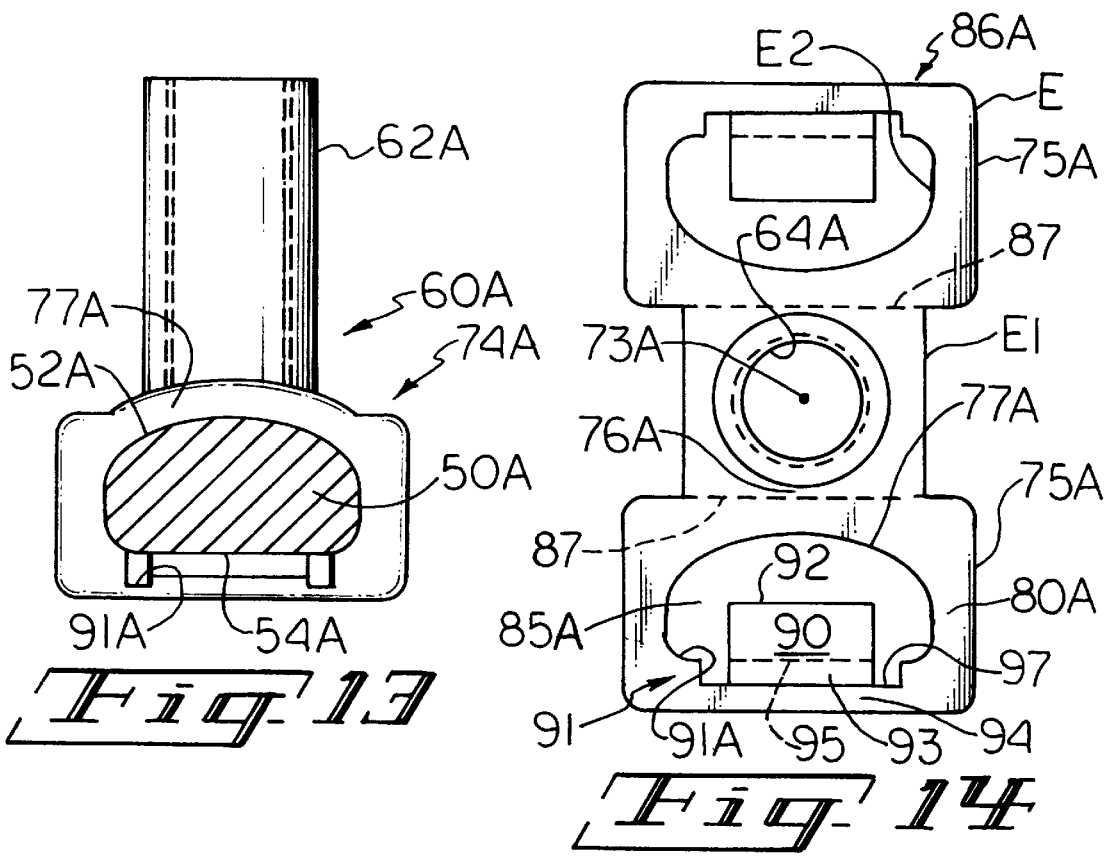
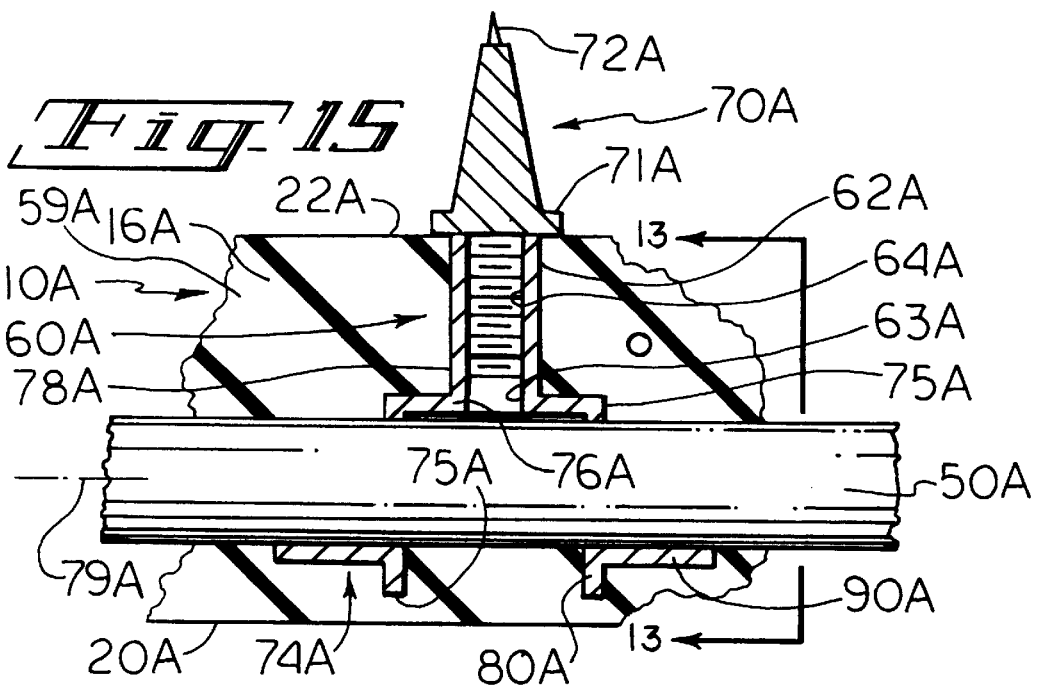

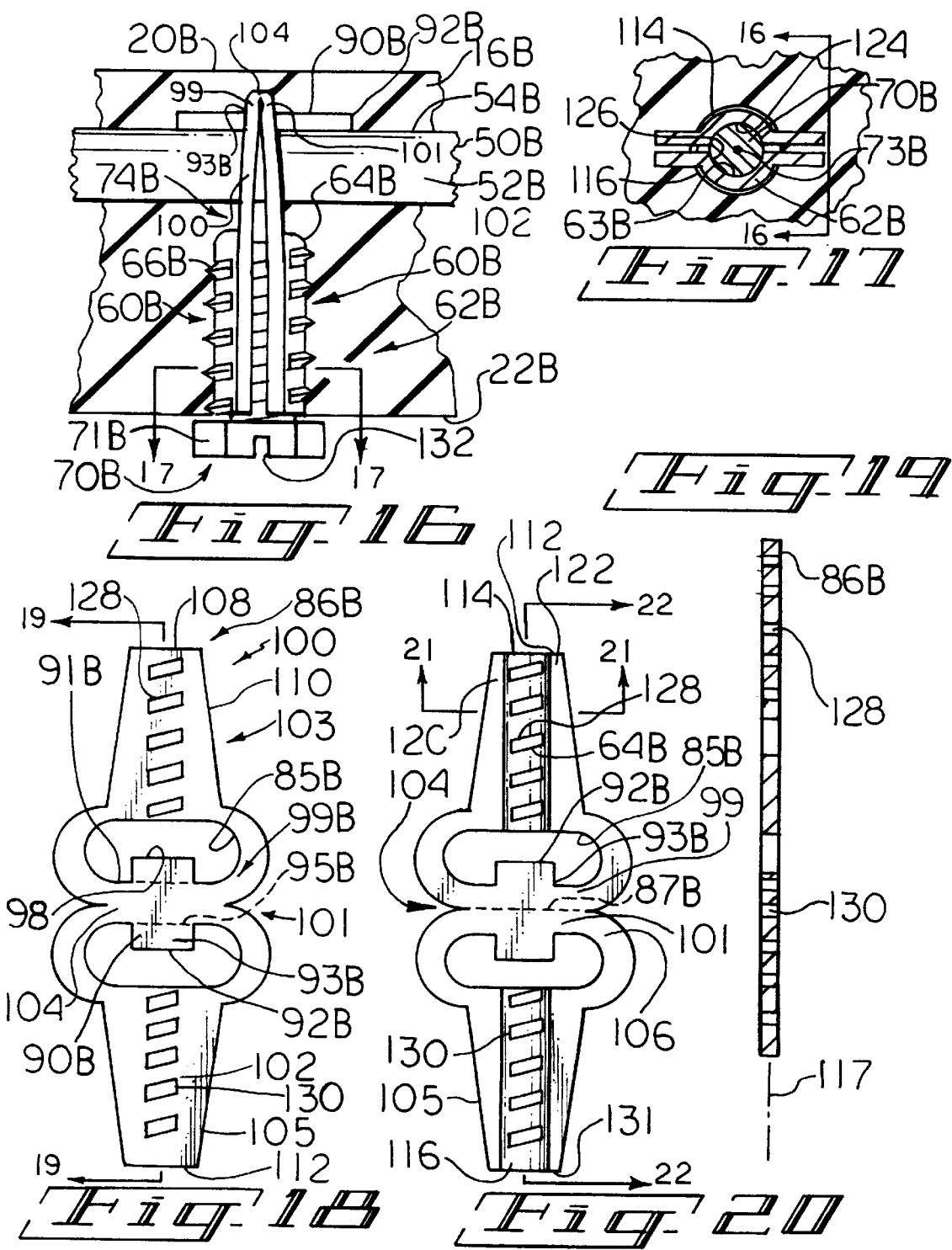

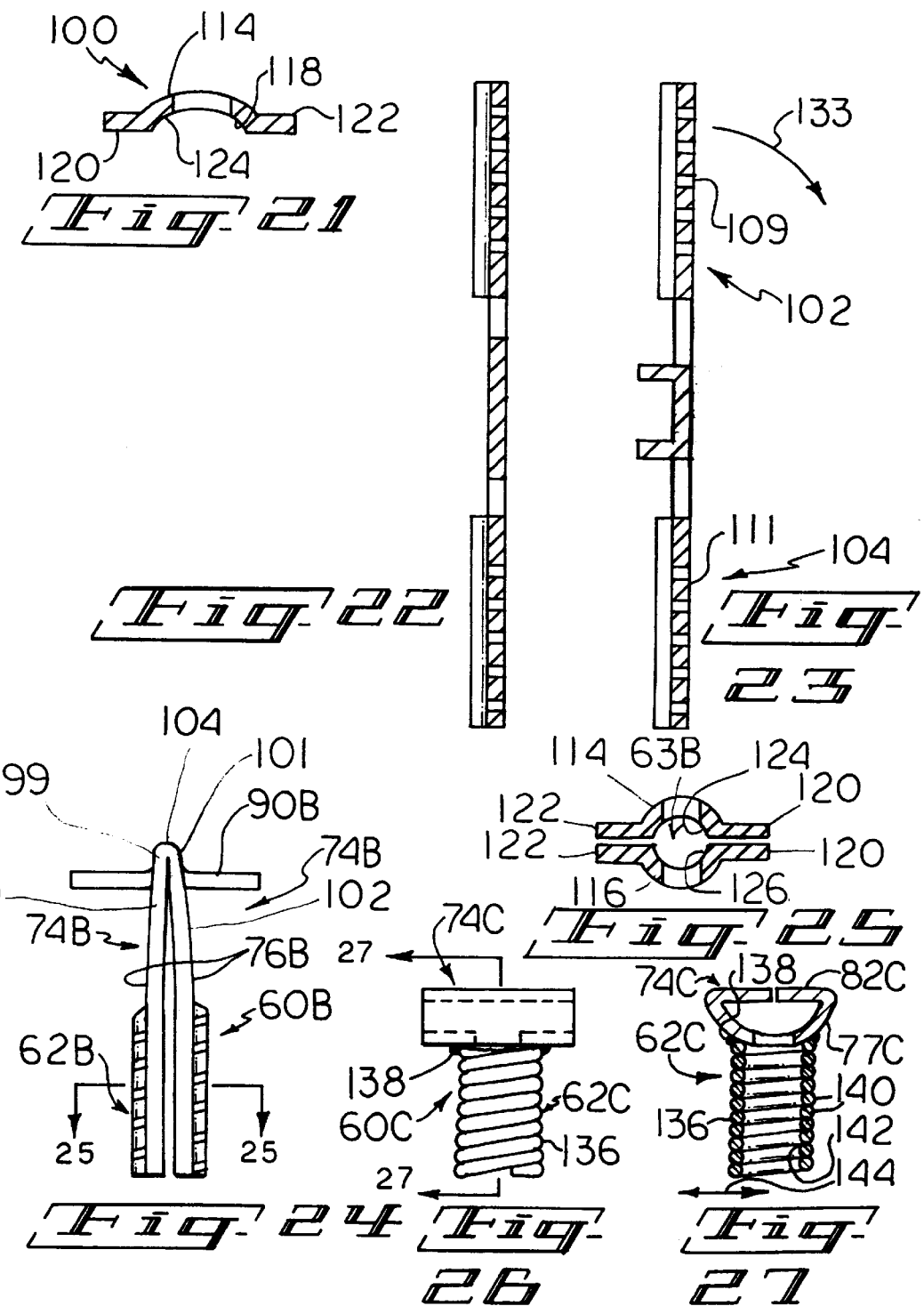

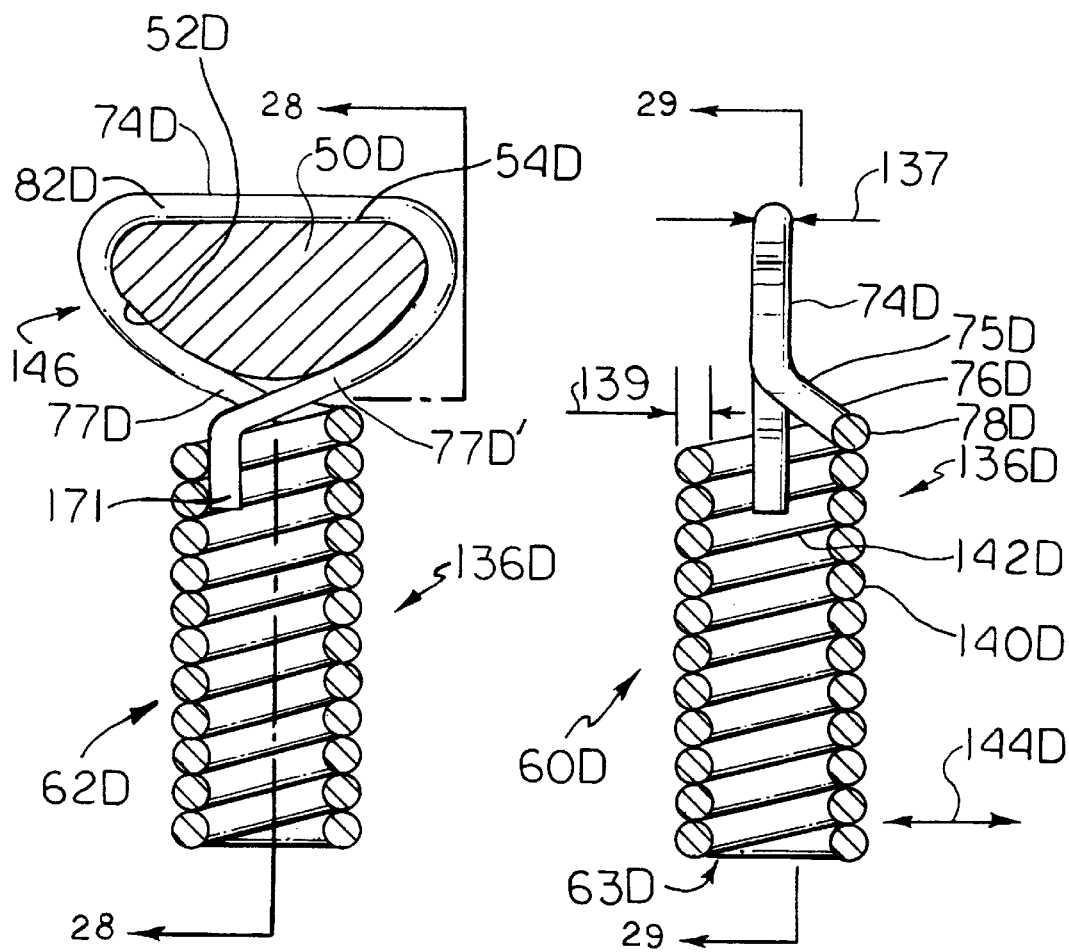

TRACTION STUD MOUNT AND METHOD OF MANUFACTURING AND MOUNTING

BACKGROUND OF THE INVENTION

1. Field of the Invention

This invention relates to a stud mount for mounting a traction stud on a vehicle drive member and more particularly to a one-piece stud mount and method of making a one-piece stud mount which is slidably received on a reinforcing rod that is thereafter embedded in an endless yieldable snowmobile drive track.

2. Description of the Prior Art and Objects

A snowmobile is a motor driven machine which is propelled by an endless drive track typically formed of resilient material such as rubber. Early attempts at improving traction on ice included a relatively complicated and expensive multiple piece grouser assembly such as that illustrated in U.S. Pat. No. 2,040,696 issued to E. A. Johnston on May 12, 1936. More recent attempts at improving the traction capability of the snowmobile while traversing slippery surfaces include traction improving products, such as the ice stud illustrated in U.S. Pat. No. 3,973,808 issued on August 10 to Jansen et al. U.S. Pat. No. 3,838,894 issued to Donald G. Reedy on Oct. 1, 1974 discloses a so-called "T-nut" which includes a head mounted on the inside of a snowmobile track and an integral threaded cylinder received in an aperture extending between the inside and outside surfaces of the track. In the Reedy patent, an ice stud is mounted on the outside of a snowmobile track and threadedly received in the outer end of the threaded cylinder.

Another "push through" ice stud which has been used heretofore, such is that disclosed in U.S. Pat. No. 5,234,266 issued to James R. Musselman on Aug. 10, 1993, includes a head disposed on the inside of the track and an integral threaded shank which passes through the snowmobile drive belt and is secured to the belt via a threaded fastener on the outside of the belt.

Both of the prior art T-nut and push through style studs require a threaded fastener for securing the stud to the drive belt. During travel, tremendous transverse forces are exerted on the snowmobile traction studs and the mounts which tend to laterally deflect or twist relative to the resilient snowmobile drive belt. Such studs are typically mounted with a backer plate or washer disposed between the stud and the track surface to help laterally stabilize the stud and preclude the stud from pulling through the track. Such prior art stud assemblies thus also include a plurality of parts which must be assembled. The turnaround time required to replace broken studs is particularly important to snowmobile racers and the assembly and disassembly of the various stud mounting components are time consuming. Accordingly, it is an object of the present invention to provide a new and novel stud mount which facilitates a faster turnaround time for replacing traction studs.

It is another object of the present invention to provide a new and novel method for mounting a traction stud on an endless drive track.

It is a further object of the present invention to provide a new and novel stud mount which will allow snowmobile racers to quickly change the snowmobile traction studs, mounted on an endless snowmobile drive track, without the necessity of replacing and/or accounting for a plurality of stud fastener parts threadedly coupled to a stud.

It is a further object of the present invention to provide a new and novel stud mount of the type described which eliminates the need for a separate fastener.

It is a still further object of the present invention to provide a stud mount and method for mounting a traction stud which utilizes a decreased number of parts to mount a traction stud on the track.

Prior art studs and stud mounts are typically not installed in original equipment snowmobile tracks but are installed as after market items and require the user to drill or cut holes into the track at a plurality of locations throughout the drive belt. It has been found that there are certain track patterns which if used, increase the traction capabilities of the stud. The cutting of such holes is time consuming and the user may not optimally place the holes to maximize traction. Accordingly, it is another object of the present invention to provide a new and novel stud mount which will facilitate the mounting of traction studs on original equipment endless drive tracks.

Yet another object of the present invention to provide a stud mount and method of manufacturing same which will enhance the production of an original equipment endless resilient drive track that includes a stud mount and polyester cords embedded therein and with the polyester cords passing, undamaged, around the stud mounts.

Still another object of the present invention to provide a new and novel stud mount and method of manufacturing same which will increase the speed of manufacture and assembly of an original equipment studded snowmobile drive belt.

The snowmobile drive tracks typically also include transversely extending fiberglass reinforcing bars or rods which have heretofore been embedded in the track for strengthening the track. Sometimes, the track includes a plurality of laterally spaced apart parallel endless drive belts which have laterally confronting, lateral edges that are integrally coupled together via transversely disposed, integral molded ribs. The reinforcing rods span the adjacent parallel belts and are located so as to be embedded in the transverse integrally molded ribs for increasing track strength.

Such reinforcing rods typically have a semi-circular cross section. During travel, tremendous transverse forces are exerted on the snowmobile traction studs and the mounts which tend to laterally deflect in the holes provided in the resilient snowmobile drive belt. Studs which are deflected relative to the track, tend to deflect or tip into a negative attitude. In a negative attitude, studs will have decreased traction capabilities or holding power than studs which are not so deflected. Stated another way, during a turn, a deflected stud, rather than assuming a digging position, will tend to assume a sliding position. Accordingly, it is another object of the present invention to provide a stud mount which will minimize deflection of a traction stud mounted on an endless resilient drive belt.

It is a further object of the present invention to provide a stud mount of the type described which will improve the traction capability of a stud mounted therein.

It has been found, according to the present invention, that it is extremely advantageous to mount a plurality of the stud mounts directly to a transverse reinforcing bars and embed them in the track along with the bars. Accordingly, it is a still further object of the present invention to provide a new and novel stud mount which is mounted to a transverse bar that is subsequently embedded in a snowmobile drive track.

It is another object of the present invention to anchor the threaded stud mounts to a rigid portion of the track.

It is another object of the present invention to anchor the new and novel stud mounts to the reinforcing bars which are thereafter embedded in the resilient drive track.

Another object of the present invention to provide a one-piece stud mount having a stud receiving threaded receptacle to which a stud is mounted and a transversely disposed integral head with a transversely disposed aperture therein for slidably receiving a transverse rod which is subsequently embedded in a snowmobile drive belt.

Still another object of the present invention is to provide a stud mount for a traction stud including a stud receiving cylinder for mounting a stud and a transversely extending integral cylinder which is slidably received on the aforesaid reinforcing rod.

It is yet another object of the present invention to provide a one-piece stud mount of the type described including a stud receiving receptacle having an aperture therein for detachably receiving a stud and a mounting head including a U-shaped base having a pair of confronting legs with apertures therethrough which are aligned to receive a transverse reinforcing rod therein.

It is another object of the present invention to provide a method of manufacturing a stud mount provided with an elongate stud receiving receptacle therein and a transversely disposed integral U-shaped head having a pair of legs with aligned apertures disposed therein for slidably receiving a transverse rod.

A further object of the present invention to provide a one-piece stud mount for a traction stud including a barrel shaped stud mount and an integral U-shaped head having mounting legs with apertures cut therein for receiving a transverse rod and also including integral cantileverly supported tabs adjacent the apertures for bearing against the transverse rod.

It is another object of the present invention to provide a new and novel one-piece stud mount and method of manufacturing same with a blank of material which is folded on itself to provide a pair of elongate confronting legs that form a traction stud receiving receptacle and include transversely disposed apertures therethrough for slidably mounting the receptacle on a reinforcing bar that is thereafter embedded in an endless drive track.

It is a further object to provide a new and novel one-piece stud mount of the type described which has an elongate traction stud receiving receptacle integrally coupled to a pair of confronting mounting legs having transverse apertures therethrough for receiving a reinforcing bar of the type described and stabilizing tabs adjacent the apertures extending transversely of the legs to rigidify the stud mount on the bar.

It is a still further object of the present invention to provide a new and novel stud mount and method of manufacture which will increase the speed of assembly of a studded drive track.

It is another object of the present invention to provide a new and novel stud mount and method of making same which will increase the speed with which worn or broken studs can be replaced.

It is another object of the present invention to provide a new and novel stud mount and method of making which will eliminate the need for threaded fasteners for fastening a traction stud to a drive track.

It is yet another object of the present invention to provide a new and novel stud mount of the type described which includes a rod mounting cylinder having a semi-cylindrically shaped passage therethrough for mating with a semi-circular shaped rod to be embedded in an endless drive track.

A further object of the present invention is to provide a stud mount comprising a mounting head including an opening therethrough having a shape complemental to the shape of a transverse reinforcing rod adapted to be embedded in an endless drive track.

A still further object of the present invention to provide an endless drive track having at least one laterally extending reinforcing rod embedded therein and a stud mount for mounting a traction stud on the rod including a base having an aperture with a shape complemental to the shape of the rod slidingly received on the rod and a stud mounting cylinder having a stud receiving aperture therein for detachably mounting a traction stud therein.

Still another object of the present invention is to provide a method of manufacturing a studded snowmobile drive track comprising the steps of forming a stud mount with a stud mounting receptacle having a stud receiving passage therein and an integral mounting head with a mounting aperture therein disposed transverse to the mounting cylinder, mounting the stud mount on a reinforcing rod, and embedding the rod and the stud mount in a band of resilient material.

A further object of the present invention is to provide a method of manufacturing a studded snowmobile track of the type described including a track embedded web including a plurality of apertures receiving and additionally securing the stud mounts.

U.S. Pat. No. 5,642,921 issued to Webb on Jul. 1, 1997, discloses a traction bolt which is threadedly coupled to a reinforcing bar that is molded into a track, however, this bolt is merely threaded through the rod and is not coupled thereto via a stud mount which is embedded in the track.

A snowmobile typically includes wear rods which are disposed along the inner bottom run of the drive track and bear against or ride along track clips that are mounted on the drive track adjacent to windows passing between the inner and outer surfaces of the track. With continual operation, substantial heat is generated due to friction and the track can be heated substantially. In the area of the track guides, the heat sometimes becomes intense and if the heat becomes too high, there is concern that the track embedded fiberglass resin reinforcing rods may deteriorate. It has been found, according to the present invention, that coupling the stud mounts directly to reinforcing rods improve the transmission of heat away from the rod. Accordingly, it is an object of the present invention to provide a new and novel stud mount which will function to dissipate heat generated in the drive track.

It is another object of the present invention to provide a new and novel stud mount which will function as a radiator for outwardly radiating the heat from the transverse mounting bars and drive track.

It is yet another object of the present invention to provide a new and novel traction stud mount of the type described including a coil spring for threadedly receiving a traction stud.

Still another object of the present invention is to provide a new and novel one-piece traction stud of the type described including a coil spring defining an elongate passage for threadedly receiving a traction stud and an integral coil loop defining a transverse opening, for yieldably mounting on a track embedded reinforcing bar.

Other objects and advantages of the present invention will become apparent to those of ordinary skill in the art as the description thereof proceeds.

SUMMARY OF THE INVENTION

A one-piece stud mount and method for mounting a one-piece traction stud to an endless track including at least one reinforcing rod having a predetermined shape embedded therein, the mount comprising a stud receiving elongate receptacle having an opening therein for detachably receiving a traction stud and a mounting head integrally coupled to the barrel and extending transversely to the barrel for mounting the barrel on the rod.

DESCRIPTION OF THE DRAWINGS

The invention may be more readily understood by referring to the accompanying drawings, in which:

FIG. 4 is an enlarged sectional end view of a completed track, taken along the section line 4—4 of FIG. 2, more particularly illustrating a stud mount received on a reinforcing bar;

FIG. 5 is an enlarged sectional side view of a molded track, taken along the section line 5—5 of FIG. 4, more particularly illustrating embedding a reinforcing rod, cloth webs, and cords in a band of resilient material, such as rubber;

FIG. 6 is an opposite sectional side view, taken along the section line 6—6 of FIG. 4, more particularly illustrating a plurality of layers of cloth and polyester cards embedded in the track about a stud mount received by a track embedded reinforcing bar;

FIG. 7 is a reduced end elevational view of only the stud mount, constructed according to the present invention, illustrated in FIGS. 1–6;

FIG. 8 is a side elevational view of a blank of material, such as steel, utilized to manufacture the stud mount illustrated in FIGS. 6 and 7;

FIG. 9 is a sectional side view illustrating an initial step in the manufacturing process of the stud mount shown in FIGS. 6 and 7 and more particularly illustrates the blank after it has been punched and drawn to form a stud receiving cylinder in the blank integrally coupled to oppositely extending transverse flanges forming a head;

FIG. 9A is a greatly reduced top plan view of the partially manufactured stud mount illustrated in FIG. 9 and more particularly illustrates the process of cutting the flanges of the head to a rectangular shape;

FIG. 9B is greatly reduced sectional side view illustrating a subsequent intermediate step in the manufacturing process wherein the head flanges are bent into a U-shape;

FIG. 10 is a sectional side view illustrating a subsequent step in the manufacturing process and more particularly illustrates the step of forming the head by shaping the flanges to conform to the shape of a rod to be embedded in the track;

FIG. 11 is a sectional side view illustrating a subsequent welding step in the manufacturing process and more particularly illustrating the adjacent terminal ends of the head flanges welded together;

FIG. 12 is a sectional side view illustrating a subsequent step of assembling the stud mount on a transverse rod and installing layers of reinforcing cloth webs and cords prior to molding the track;

FIG. 13 is an enlarged sectional side view, illustrating a slightly modified stud mount construction mounted on a transverse reinforcing bar, taken along the section line 13—13 of FIG. 15;

FIG. 14 is a layed out view of a blank of material, utilized to form the stud mount illustrated in FIG. 13, after a forming and punching process has been completed to form a stud receiving barrel and after holes have been cut into the outer flange portions and tab cuts therein;

FIG. 15 is a sectional end view illustrating the modified embodiment, illustrated in FIGS. 13 and 14, assembled on a transverse reinforcing rod and molded in an upper run of an endless snowmobile drive track;

FIG. 16 is a sectional end view of a lower run of an endless snowmobile drive belt, having a reinforcing bar embedded therein, mounting a traction stud mount constructed according to a slightly further modified embodiment, taken along the line 16—16 of FIG. 17 with part of the track broken away to more particularly illustrate the relationship between the stud mount and the reinforcing rod;

FIG. 17 is a sectional plan view, taken along the line 17—17 of FIG. 16;

FIG. 18 is a plan view of the traction stud mount illustrated in FIGS. 16 and 17 in an initial stage of manufacture and more particularly illustrates a laid out longitudinally aligned blank of material, such as steel, cut to a desired shape and longitudinally spaced thread apertures are cut into distal leg portions thereof;

FIG. 19 is a sectional view, taken along the section line 19—19 of FIG. 18;

FIG. 20 is a plan view illustrating the traction stud mount in a subsequent step of the manufacturing process wherein longitudinal grooves are formed in the distal leg portions and screw thread apertures are cut in the grooves thus formed;

FIG. 21 is a sectional view, taken along the section line 21—21 of FIG. 20;

FIG. 22 is a sectional view, taken along the section line 22—22 of FIG. 20;

FIG. 23 is a sectional view, similar to FIG. 22, illustrating the traction stud mount in a subsequent step of the manufacture wherein the mounting head tabs are displaced out of the plane of the blank of material to a cantileverly supported position;

FIG. 24 is an end elevation view illustrating the stud mount in a final manufacturing step operation wherein identically formed halves of the blank illustrated in FIG. 23 are folded into confronting relation to form the stud mount constructed according to another alternate embodiment;

FIG. 25 is a sectional top plan view, taken along the section line 25—25 of FIG. 24;

FIG. 26 is an end elevational view of still another embodiment of a further slightly modified stud mount;

FIG. 27 is a sectional side view, taken along the section line 27—27 of FIG. 26;

FIG. 28 is a sectional end view, taken along the section line 28—28 of FIG. 29, of yet another modified stud mount only, wherein the stud mounting cylinder and the head for mounting the cylinder on the track reinforcing bar comprise a one-piece spring; and FIG. 29 is a sectional side view, taken along the line 29—29 of FIG. 28, illustrating the stud mount yieldably mounted on a snowmobile drive belt reinforcing bar.

DESCRIPTION OF PREFERRED EMBODIMENT

A snowmobile drive track constructed according to the present invention, generally designated 10, includes an endless drive belt 16 trained around a pair of drive sprockets or wheels, one of which is illustrated at 12, for driving the belt 16 in endless path represented by the arrow 14. The endless belt 16 may suitably comprise flexible rubber having a plurality of longitudinally extending polyester cords 18 (FIG. 4) which are sandwiched between a pair of cloth webs C and C 1 embedded therein to strengthen the track.

Figure 3:
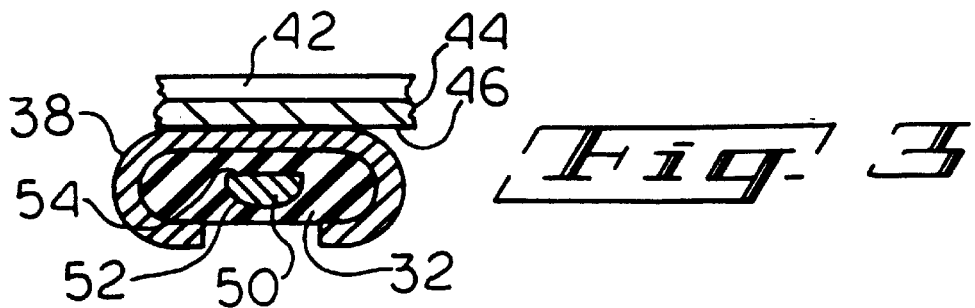
FIG. 3 is an enlarged sectional side view, taken along the section line 3—3 of FIG. 2, more particularly illustrating a track clip mounted on a portion of the track which receives a reinforcing bar.

The belt 16 includes an inner face 20 and an outer face 22 which, as it passes along the lower run of the belt, engages a surface 24 to be traversed. The inner track surface 20 integrally mounts spaced apart pairs of laterally spaced drive lugs 28 which are spaced along the length of the inside of the belt 16 for engaging the drive wheels 12 as usual. The belt 16 includes a plurality of laterally spaced apart endless parallel sub-belts 31 of differing widths coupled together by integral track coupling sections or bars 32 to form a plurality of longitudinally spaced apart, longitudinally aligned windows or openings 30 which pass between the inner and outer surfaces 20 and 22. Mounted on the track coupling sections 32 are generally U-shaped outwardly opening, metal, track clips 38 on which snowmobile mounted gliders or rails, generally designated 40, bear. The glider 40 includes an upstanding plate 42 dependently mounting a longitudinal flat wear bar 44 having an under surface 46 which bears against the upper surfaces of the track clips 38 as illustrated in FIGS. 3 and 4.

The track windows 30 allow snow on the surface 24 being traversed to enter and pass between the glider wear bar 44 and the track clips 38 to provide lubrication therebetween to cool the track.

Embedded in the belt coupling sections 32 of the track 16 and spanning the adjacent parallel belts 31 is a plurality of spaced apart, transversely extending reinforcing rods or bars 50 which, as illustrated in FIG. 5, have a generally semi-cylindrical shape including a semi-circular outer surface 52 and a flat inner side surface 54.

The outer track surface 22 mounts a plurality of rows 58 of drive lugs 59 integrally formed with the track 16. These lugs 59 engage the surface 24 and snow for increasing traction.

The construction described heretofore is entirely conventional.

The stud mount, generally designated 60, constructed according to the present invention, includes a longitudinally extending threaded right circular receptacle, barrel, cylinder, or stack 62, of uniform diameter or transverse breath having an elongate opening 63 internally threaded at 64 for threadedly receiving complementally shaped threads 66 on the shank 68 integrally formed with a snowmobile stud 70. The stud 70 includes a carbide tip 72 mounted in the outer terminal end thereof for engaging the surface 24 to be traversed. The stud 70 includes an integral flange 71 which has wrench flats 69 for turning the stud about its axis 73 into the cylinder 62.

The stud mount 60 includes a mounting head, generally designated 74, disposed transverse to, but integral with, the stud mounting cylinder 62. The mounting head 74 includes a pair of oppositely extending integral flanges 75 each having an inner base portion 76 which is integrally formed with the inner end 78 of the stud mounting barrel 62. The head flanges 75 include intermediate flange portions 77 which are displaced to a curvilinear shape, illustrated in FIG. 6, conforming to the outline of the underside 52 of reinforcing bar 50. The flanges 75 also include upper outer flange portions 80 which are folded inwardly toward each other to the confronting, coplanar positions, illustrated in FIG. 6, so that the terminal ends 82 thereof are in abutting or confronting relation and welded at 84.

Figure 1:
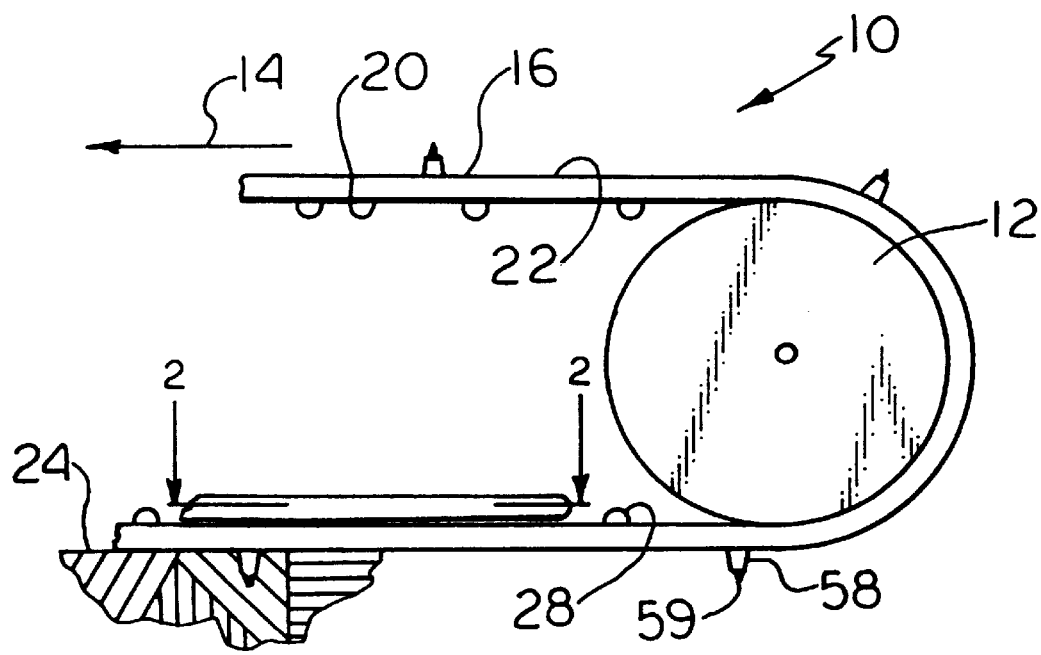
FIG. 1 is a diagrammatic side elevational view of a snowmobile drive track constructed according to the present invention incorporating a stud mount constructed according to the present invention, with the surface being traversed broken away in section.
Figure 2:
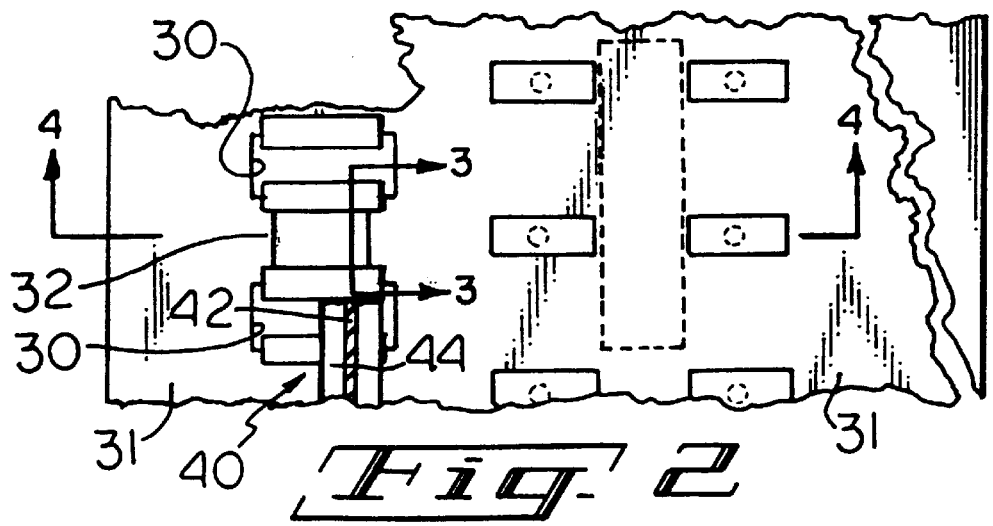
FIG. 2 is a fragmentary sectional plan view, of the lower run of the endless track taken along the section line 2—2 of FIG. 1, one of the drive wheels being illustrated in phantom.

As illustrated, the flanges 75 are oppositely folded toward each other to conform to the semi-cylindrical shape or outline 52, 54 of the reinforcing rods 50. The intermediate flange portions 77 conform to the shape of the curvilinear outline of rod surface 52 and the outer flange portion 80 are disposed in the same plane for bearing against the planar surface 54. The flanges 75 cooperate to define a transversely extending passage 85, having a transverse axis 79, which is transverse to the stud receiving barrel opening 63 and axis 73. As illustrated in FIGS. 1 and 7, the transverse length of head 74 is substantially greater than the breath or diameter of the stud mounting barrel 62, so that the transversely opposite terminal ends of the mounting head 74 are cantileverly supported on the inner end 78 of the stud mounting barrel 62. Each completed stud mount 60 is aligned with, and then slid over, one of the reinforcing rods 52 which is subsequently embedded in the resilient rubber track 16.

The Method of Manufacturing

A stud mount 60 is formed from a circular metal blank or sheet 86 (FIG. 8) which is drawn, punched and displaced from the planar condition illustrated in FIG. 8 to the altered condition illustrated in FIG. 9 to form the barrel 62 having a pair of oppositely disposed head flanges 75. The head flanges 75 are cut along right angularly disposed lines L8, L9, L10 and L11 (FIG. 9A) to form a rectangle. The cylinder 62 defines an elongate stud receiving passage 63. The inner surface of the cylinder 62 is threaded as illustrated at 64 and the flanges 75 are displaced into a U-shaped illustrated in FIG. 9b so that the intermediate flange portions 77 are shaped to conform to the lower semi-circular outline 52 of the transverse bar 62.

The terminal flange ends 82 are then folded inwardly to the coplanar, confronting positions illustrated in FIG. 10.

The abutting or confronting ends 82 are then welded via a weld bead 84 (FIG. 11) to complete the transverse mounting passage 85 which extends transversely to the opening 63 in the stack or barrel 62. The completed stud mount 60 is then mounted on a transverse reinforcing bar 52 (FIG. 12) by sliding it axially along the length of the bar 52 to a position in which it will be aligned with one of the track drive lugs 59 to be formed on the outside surface 22 of the track 16. The stud mounts may vary in number and location but are disposed in predetermined patterns so that the studs do not follow in the same track.

The bands of polyester cord 18 are suitably sandwiched between cloth webs C and C1 (FIG. 12) which are disposed inwardly of the reinforcing bars 50 and the stud mounts 60.

A third cloth web C2 (FIG. 12) having locating apertures A therein which snugly receive the stud mount barrels C2 is disposed outwardly of the reinforcing bars 50. The web C2 will hold the stud mounts 60 in predetermined positions on the reinforcing bars 30 during the molding operation and will laterally stabilize the stud mounts 60 to prevent them from being ripped out of the track during use. An endless layer or belt 16 of rubber is molded about the polyester cords 18, the reinforcing bars 50 the mounting heads 74, the cloth layers C, C1 and C2, and the stud mounting cylinders 62. The outer terminal ends 87 of the stud mounting cylinders 62 are substantially flush with the outer track surface 22 on lugs 59 to enable easy access to the cylinder openings 63.

Alternatively, rather than initially folding the confronting flange ends 82 into the coplanar, welded positions illustrated in solid lines in FIG. 10, the terminal flange ends 82 may be partially folded or crimped inwardly to the partially folded positions illustrated at 82A in FIG. 10. The stud mounts in this partially folded position are then "loosely" slid onto the reinforcing bars and the partially crimped flange ends 82A will temporarily hold the barrel 62 on a reinforcing bar 50. When suitably positioned on a bar 50, the flange ends are "hit" with a dimpling tool at 82C causing the flange ends to move from the partially crimped positions, illustrated in chain lines at 82A in FIG. 10, to the folded coplanar positions, illustrated in solid lines in FIG. 10, fastened to the bar 50. The dimpling tool will form dimples on the insides of the flange ends 82C to fix them to the reinforcing bar 50.

As another alternative, the confronting flange ends 82 may be over-folded or over-sprung to the over-folded or over-sprung positions illustrated in chain lines at 82B. The flange ends 82B will tend to remain in the positions illustrated in chain lines but will yield to allow them to be sprung to the positions illustrated in solid lines in FIG. 10 so as to the position to be slid onto a reinforcing bar 50. The spring tension in the flanges 82 will temporarily hold the stud mounts 60 during the forming process. As illustrated in FIGS. 8–12, the thicknesses of blank 86, the wall of cylinder 62, and the flanges 75 are substantially uniform and equal to each other such that the opposing surfaces thereof are substantially equidistantly spared apart throughout their respective lengths.

The traction studs 70 are then threaded into the cylinders 62. Such stud insertion may not occur during manufacture but only subsequently by the end user. If one of the studs 70 breaks during usage, the broken stud can be easily unthreaded and a new stud 70 installed without having to remove a fastener or washer which expedites the turnaround time that is extremely important to racers.

Preferably, some of the stud mounts 60 are placed in close proximity to the track windows 30 and to the track clips 38 where substantial heat is generated as a result of the friction between the track clips 38 and the wear rails 42. The rods 50, which are manufactured from fiberglass resin, may deteriorate or "break down" if the rod 50 becomes too hot. Accordingly, the stud mount 60 functions as a radiator for cooling the track and the reinforcing bars.

When the track molding operation is completed, the assembly will appear as illustrated in FIGS. 4 and 6.

Alternate Embodiment

A slightly modified stud mount, generally designated 60A, is illustrated in FIGS. 13–15 and generally similar parts will be referred to by generally similar reference characters followed by the letter A subscript. The stud mount 60A includes a stud mounting receptacle 62A and a transverse mounting head, generally designated 74A which includes a pair of flanges or strips 75A that are bent to the U-shape illustrated in FIG. 15 with the outer terminal portions 80A comprising a pair of generally parallel legs extending from an inner base 76A. Each of the outer terminal legs 80A includes a mounting aperture 85A which is cut therein in a generally semi-cylindrical shape which conforms to the shape of the semi-cylindrical track reinforcing rod 50A.

The base 91 of each aperture 85A includes two-coplanar distal edges 91A which are substantially in the plane of the flat rod surface 54A of reinforcing rods 50A. The aperture 85A includes a pair of recesses 97 on opposite sides of the base 93 of a tab or tongue 90 which is cut into each leg 80A. The tongue 90 includes a base 93 which remains integral with the leg 80A to cantileverly support the terminal end portion 92 of tongue 90 which initially remains in the plane of the leg 80A and projects into the opening 85A. The base 93 of tab 90 remains integrally coupled to a remaining web 94 on the leg 80A and is bent or folded along the junction 95 of tongue portions 92 and 93 outwardly to a plane normal to the plane of the legs 80A to the positions illustrated in FIG. 15. The tabs 90A are initially disposed in the plane of the legs 80A and are then folded outwardly to the cantileverly supported positions illustrated in FIG. 15 in a plane normal to the plane of the legs 80A.

The process of manufacturing the modified embodiment 60A is generally similar to that described above with regard to FIGS. 8 and 9 wherein a steel blank, generally designated 86A and cut to the outline illustrated in FIG. 14, is drawn and punched to form barrel, cylinder or receptacle 62A therein. The barrel or cylinder 62A is internally threaded at 64A.

Rather than folding the outer leg ends 80A into abutting relationship as illustrated in the embodiment shown in FIG. 6, the legs 80A are folded along the fold lines, illustrated in dash lines, at 87 from the planar positions illustrated in FIG. 14 to the perpendicularly arranged positions illustrated in FIGS. 13 and 15. The tabs 90 are folded outwardly, along dashed line 95, to the positions illustrated in FIG. 15 and the device is then slid onto a reinforcing bar 50A in the position to be received by a molded drive lugs 59A. The track 10A, including the lug 59A is then molded to encapsulate the reinforcing bar 50A and stud mount 60A. After the track molding is completed, the studs 70 are threaded into the threaded barrel 62.

The stud mount and the method thus facilitates the mounting of snowmobile traction studs in a snowmobile drive belt without any fastening devices or welding. In the event one of the studs 70A is fractured or it is desired to replace the stud 70A with a substitute stud, it need only be unthreaded and a new stud threaded into its place without the requirement of removing any fastening devices. Accordingly, the studs can be quickly interchanged which can be very important in racing situations.

Another Alternate Embodiment

Another slightly further modified stud mount, generally designated 60B, is illustrated in FIGS. 16–25 and generally similar parts will be referred to by generally similar reference characters followed by the letters B subscript.

The stud mount 60B includes a stud mounting receptacle, generally designated 62B, integrally coupled to a transverse, mounting head, generally designated 74B. The stud mount 60B is manufactured from a metal blank, generally designated 86B, cut to the shape illustrated in FIG. 18, having a pair of substantially identical legs 100 and 102 having base or hinge ends 99 and 101, respectively, integrally coupled together at a central joint 104 and free generally planar strip ends 103 and 105, respectively.

Each of the legs 100 and 102 includes a transverse mounting aperture 85B which is cut therein adjacent the hinge end 99 and 101, respectively, in a generally semi-cylindrical shape or the shape illustrated to conform to the shape or outline of the track reinforcing rod SOB. The base of each aperture 85B includes co-planar or distal edges 91 B which are substantially in the plane of the flat rod surface 54B of the reinforcing rods 50B. A tab, tongue or ear 90B is allowed to remain integrally coupled to each base 91B via a hinge 93B and includes a terminal end 92B which initially projects into the opening 85B. Flanges 90B are bent out of the planes of the legs 100 and 102 to the positions normal thereto (FIG. 16) intermediately adjacent the openings 85B. The legs 100 and 102 each comprise a planar flange 108 having outwardly converging side edges 110 terminating in a terminal edge 112.

At the same time that the blank is stamped or cut to the initial outline or shape illustrated in FIG. 18, a plurality of longitudinally spaced apart inclined thread apertures 128 and 130 are cut or punched into elongate strip portions 114 and 116, respectively, and are spaced relative to each other to receive the screw threads 66B of a stud shank 68B of a stud, generally designated 70B.

Before the legs 100 and 102 are folded to the positions illustrated in FIG. 16, the blank 86B is disposed in a punch press to displace elongate central strip portions 114 and 116 out of the plane 117 to the arcuate shape illustrated at 118 in FIG. 21. The elongate strip portions 114 and 116 are displaced out of the plane 117 to the arcuate shape illustrated in FIG. 21 between the integral planar flange portion 120 and 122, (FIG. 21) respectively, which remain in the plane 117. When folded to the confronting, folded positions illustrated in FIGS. 16 and 25, the arcuate portions 114 and 116 are displaced in opposite directions relative to each other out of the planes of the legs 100 and 102, and the interior surfaces 124 and 126 of arcuate portions 114 and 116, respectively, cooperate to form an elongate stud receiving passage 63B.

The traction stud 70B differs from the stud 70 in that rather than having a carbide tip mounted in an outwardly projecting ground engaging stud, the stud 70B merely includes a head 71B of a screw having a slot 132 therein for receiving a screw driver or the like. The head 71B also includes wrench flats 69B which may be engaged by a wrench for turning a screw about its axis 73B.

Alternate Process of Manufacturing

The process of manufacturing the alternate stud mount 60B illustrated in FIGS. 16 and 17 commences with a planar blank 86B which is initially cut to the shape or outline illustrated in FIG. 18. The blank 86B is also cut along a semi-circular line 93B and thence along a base 91B to form the tabs 90B. The portion cut out to form the apertures 85B are removed and discarded. The thread openings 128 and 130 are concurrently cut therein. The thread openings 128 in leg 100 are staggered longitudinally relative to the openings 130 in leg 102 so that the screw threads 64B of the stud 70B will be received therein when the stud is mounted.

The blank 86B is then placed into a press which deforms or displaces the elongate arcuate portions 114 and 116 to the arcuate shape illustrated in FIG. 21. Thereafter, the tongues 90B are displaced 90° to the positions illustrated in FIG. 23 and thence the blank 86B is folded over on itself in the direction of the arrow 133 (FIG. 23) to the position illustrated in FIG. 24 so that the back sides 109 and 111 of legs 102 and 104, respectively, are in confronting relation to dispose the arcuate portions 114 and 116 in confronting relation as illustrated in FIGS. 16, 17, 24 and 25.

The stud mount 60B is then disposed adjacent the end of a reinforcing bar 50B and the bar 50B is aligned with the opening 85B. The stud mount 60B is axially slid onto the reinforcing bar 50B to any one of a plurality of longitudinally spaced apart selected positions thereon. Suitable reinforcing cloth webs and cords as illustrated in FIGS. 5 and 6, may be added. Thereafter, rubber or other similar material is heated to a sufficient consistency so as to mold about the bar 50B and the stud mounts 60B so that the outer track surface 32B is substantially flush with the terminal ends 131 of legs 102 and 104 so as not to fill the stud opening 63B.

After the resilient material is allowed to cure, traction studs 70 are threaded into the internal thread 64B formed by openings 128 and 130. As the stud 70B enters the passage 63B, it will tend to spread the opposing legs 110 and 112. The yieldable material comprising the track 1 6B will tend to hold the legs 100, 102 to the positions illustrated in FIG. 24 but will allow slight spreading movement thereof to the positions illustrated in FIG. 17 as the threaded shank 68B of the stud 70B is threaded therein. The transversely extending flanges 90B of the mounting head 74B bear against the flat surface of the reinforcing bars 32 to prevent transverse movement thereof relative to the axis 33B as the head 71B engages the surface being traversed. In the event that the stud 70B becomes worn, a screwdriver, or the like, can be inserted into the slot 132 to unthread the worn stud and another one replaced in its stead. This can easily accomplish without the necessity of removing any nuts or threaded fasteners and thus, a quick turn around can be accomplished.

A Further Embodiment

Referring now more particularly to FIGS. 26 and 27, a further modified stud mount 60C is illustrated and is similar in many respects to studs 60, 60A and 60B and generally similar parts will be identified by generally similar reference characters filed by the letter C subscript.

The stud mount 60C includes a stud mounting receptacle, generally designated 62C, and a mounting head, generally designated 74C for mounting the stud mount 60C on a track reinforcing bar. The stud mounting head 60C is basically identical to the head 60. Rather than a solid cylinder 62, the stud mounting receptacle 62C comprises a tightly wound coil spring 136 which is integrally welded at 138 to a semi-cylindrically shaped mounting head 74C which is identical to the head 74. The adjacent coil sections 140 of the coil spring 136 define grooves 142 therebetween into which the threads of a stud (not shown) are received and purchase. The spring mount can yield transversely, in the direction of an arrows 144 which can provide some desirable operating characteristics under some circumstances.

Still Further Embodiment

Referring now more particularly to FIGS. 28 and 29, a still further modified stud mount 60D is illustrated and is similar in many respects to stud 60, 60A, 60B and 60C and generally similar parts will be identified by generally similar reference characters followed by the letter D subscript.

The stud mount 60D is most similar to the stud mount 60C, however, the stud mount 60D, includes a one-piece stud mounting cylinder 62D and mounting head 74D. The stud mounting cylinder 62D comprises a tightly wound coil spring 136 D having a plurality of adjacent coil sections 140D defining grooves 142D therebetween for receiving the threads of a traction stud (not shown) which are received therein for purchase.

The coil spring 136D, which defines an elongate stud receiving opening 63D, can yield transversely, in the direction of the arrows 144D relative to the head 74D, which is mounted on a traction bar traction bar 50D.

The mounting head 74D is an integral part of, or a continuation and/or extension of, the tightly wound coil spring 136D. Rather than having an elongate band of material of head 74C, the head 74D comprises a single loop coil 146 having a first intermediate flange portion 75D provided with one end or base portion 76D integral with an inner end most loop or coil 78D of the coil spring 136D. The loop 146 includes a terminal free end 171. The axially length 137 of head 137D thus equals the diameter 139 of the individual wire loops or coils 136D.

Between the ends 76D and 171, coil spring 146 of head 74D includes the first intermediate flange portion 75D which has an inner end or base portion 76D, an intermediate curvilinear or coil flange portion 77D that conforms to the underside 52D of a reinforcing bar 50D, and an integral horizontal portion 82D which fits tightly against the upper flat wall 54D of the reinforcing bar 50D. The mounting head coil 146 also includes an integral opposing integral curvilinear end portion 77D' conforming to the curvilinear underside 52D. The axially extending terminal end 171, which is integral with the base portion 77D, is disposed on the inside of the coil spring 136D as illustrated. The entire stud mount including portions 74D, 74D', comprises yieldable material, such as spring steel wire and the portion 77D and 77D' can be yieldably spread apart to bar gripping position illustrated in FIG. 9 to spaced apart positions to receive a reinforcing bar 50D therebetween as illustrated in FIG. 29.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What we claim is:

1. A one-piece stud mount for mounting a traction stud to a laterally extending reinforcing rod, having a predetermined transverse outline and adapted to be embedded in an endless resilient drive belt, said stud mount comprising:

longitudinally extending, stud receiving means, having a first longitudinal opening with a longitudinal axis therein, for detachably receiving a portion of a traction stud; and mounting head means, adapted to be embedded in said drive belt, integrally coupled to said stud receiving means and extending transversely to said stud receiving means, for mounting said stud receiving means on said reinforcing rod;

said stud receiving means comprising a stud mounting cylinder integral with said mounting head means and including a cylindrical wall which is internally threaded for detachably threadedly mounting said portion of said traction stud;

said mounting head means including a pair of oppositely extending flanges on opposite sides of said cylinder; each of said flanges having an inner portion coupled to said cylinder and an outer portion for receiving said rod.

2. A one-piece stud mount for mounting a traction stud to a laterally extending reinforcing rod, having a predetermined transverse outline and adapted to be embedded in an endless resilient drive belt, said stud mount comprising:

longitudinally extending, stud receiving means, having a first longitudinal opening with a longitudinal axis therein, for detachably receiving a portion of a traction stud; and mounting head means, adapted to be embedded in said drive belt, integrally coupled to said stud receiving means and extending transversely to said stud receiving means, for mounting said stud receiving means on said reinforcing rod;

said mounting head means including a pair of oppositely extending flanges on opposite sides of said longitudinally extending, stud receiving means; each of said flanges having an inner portion integrally coupled to said longitudinally extending stud receiving means and an outer portion for receiving said rod.

3. A one-piece stud mount for mounting a traction stud to a laterally extending reinforcing rod, having a predetermined transverse outline and adapted to be embedded in an endless resilient drive belt, said stud mount comprising:

longitudinally extending, stud receiving means, having a first longitudinal opening with a longitudinal axis therein, for detachably receiving a portion of a traction stud; and mounting head means, adapted to be embedded in said drive belt, integrally coupled to said stud receiving means and extending transversely to said stud receiving means, for mounting said stud receiving means on said reinforcing rod;

said stud receiving means comprising an elongate stud mounting cylinder having
a cylindrical wall of substantial uniform radial thickness, and
an elongate, internally threaded radially inner surface for detachably threadedly receiving said portion of said traction stud, and
a radially outer surface of substantially uniform lateral breadth throughout its length.

4. The one piece stud mount set forth in claim 3 wherever elongate cylinder comprises a right circular cylinder.

5. The one piece stud mount set forth in claim 3 wherein said mounting head means comprises a base integrally coupled to said stud mounting cylinder and having a lateral length substantially greater then said lateral breadth of said elongate cylinder.

6. The one piece stud mount set forth in claim 3 wherein said mounting head means comprises a laterally extending base integral with said stud mounting cylinder and having transversely opposite terminal ends cantileverly supported on said stud mounting cylinder.

7. A one-piece stud mount for mounting a traction stud to a laterally extending reinforcing rod, having a predetermined transverse outline and adapted to be embedded in an endless resilient drive belt, said stud mount comprising:

longitudinally extending, stud receiving means, having inner and outer ends and a first longitudinal opening with a longitudinal axis therein extending between said ends, for detachably receiving a portion of a traction stud;

said inner end of said stud receiving means having a predetermined transverse breadth; and mounting head means, adapted to be embedded in said drive belt, integrally coupled to said inner end of stud receiving means and extending transversely to said stud receiving means, a predetermined distance substantially greater than said predetermined transverse breadth for mounting said stud receiving means on said reinforcing rod.

8. A one-piece stud mount for mounting a traction stud to a laterally extending reinforcing rod, having a predetermined transverse outline and adapted to be embedded in an endless resilient drive belt, said stud mount comprising:

longitudinally extending, stud receiving means, having a first longitudinal opening with a longitudinal axis therein, for detachably receiving a portion of a traction stud; and mounting head means having an inner end, adapted to be embedded in said drive belt, integrally coupled to said stud receiving means and extending transversely to said stud receiving means, for mounting said stud receiving means on said reinforcing rod;

said mounting head means comprising a base, integrally coupled to said inner end of said stud receiving means, having transversely opposite terminal ends cantileverly supported on said inner end of said stud receiving means;

said base, having an aperture with an aperture axis for receiving said rod, integrally coupled to said stud receiving means;

said aperture axis being substantially perpendicular to said longitudinal axis.

9. A one-piece stud mount for mounting a traction stud on a reinforcing bar, having a cross-section of predetermined shape and adapted to be embedded in an endless resilient drive belt, said stud mount comprising:

a mounting head, adapted to be embedded in said belt, including an aperture therein with a first axis for being received on the bar; and stud mounting means, integral with but projecting transversely from said mounting head and adapted to be at least partially embedded in said belt, including a stud receiving passage therein;

said stud receiving passage having a second axis transverse to said first axis for detachably receiving a traction stud;

said mounting head including a pair of flanges each having an inner end portion integrally coupled to said stud mounting means and an outer end portion.

10. A one-piece stud mount for mounting a traction stud on a reinforcing bar, having a cross-section of predetermined shape and adapted to be embedded in an endless resilient drive belt, said stud mount comprising:

a mounting head, adapted to be embedded in said belt, including an aperture therein with a first axis for being received on said bar;

said mounting head having predetermined opposite terminal ends and being a predetermined length;

stud mounting means, integral with but projecting transversely from said mounting head and adapted to be at least partially embedded in said belt, including a barrel of substantially uniform breadth having stud receiving passage therein;

said stud receiving passage having a second axis transverse to said first axis for detachably receiving a traction stud.

11. The one-piece stud mount set forth in claim 10 wherein said stud mounting means is integral with only a portion of said mounting head intermediate said opposite terminal ends.

12. The one piece stud mount set forth in claim 10 wherein said outer end portions are disposed in confronting relation with each other and coupled together to form a cylinder transverse to said stud mounting means; said cylinder defining a passage with a second axis transverse to said first axis; said opposite terminal ends being cantileverly support on said barrel.

13. The one piece stud mount set forth in claim 10 wherein said barrel is a right circular, internally threaded cylinder.

14. In an endless drive track having an endless resilient belt including laterally opposite side edges, inner and outer faces spanning said laterally opposite side edges, and at least one laterally extending reinforcing rod, having a cross-section with a predetermined shape, embedded in said resilient belt;

one-piece means, at least partially embedded in said belt, for mounting a traction stud on said rod including a mounting head of predetermined length and having opposite terminal ends and an aperture with a shape complemental to said predetermined shape of said rod, slidably received on said rod; and stud mounting means of substantially uniform lateral breadth having an inner portion integrally coupled to said mounting head and embedded in said track;

said stud mounting means having a terminal end portion disposed adjacent said outer face of said track and including a stud receiving threaded aperture therein for detachably mounting a traction stud;

said stud mounting means extending from said base in a direction away from said rod toward said outer face of said track.

15. The endless drive trace set forth in claim 14 wherein said stud mounting means comprises a hollow barrel of substantially uniform breadth throughout its length.

16. The endless drive track set forth in claim 15 wherein said barrel comprises a right circular cylinder.

17. The endless drive track set forth in claim 14 wherein said inner portion of said stud mounting means has a breadth which is substantially less then said predetermined length.

18. The endless drive track set forth in claim 14 wherein said opposite terminal ends are cantileverly supported on said stud mounting means.

19. In an endless drive track having an endless resilient belt including laterally opposite side edges, inner and outer faces spanning said laterally opposite side edges, and at least one laterally extending reinforcing rod, having a cross-section with a predetermined shape, embedded in said resilient belt;

one-piece means, at least partially embedded in said belt, for mounting a traction stud on said rod including a mounting head, having an aperture with a shape complemental to said predetermined shape of said rod, slidably received on said rod; and stud mounting means having an inner portion integrally coupled to said mounting head and embedded in said track;

said stud mounting means having a terminal end portion disposed adjacent said outer face of said track and including a stud receiving threaded aperture therein for detachably mounting a traction stud;

said stud mounting means extending from said mounting head in a direction away from said rod toward said outer face of said track; and a sheet of material embedded in said belt having a plurality of location apertures therein receiving said stud mounting means on one side of said rod; a pair of reinforcing sheets embedded in said belt on an opposite side of said rod; and a plurality of longitudinally extending elongate reinforcing cords sandwiched between said reinforcing sheets.

20. A method of manufacturing a one-piece traction stud mount adapted for mounting on a reinforcing rod, having a predetermined cross-sectional shape, which may be subsequently embedded in an endless resilient drive belt, comprising the steps of:

forming a longitudinally extending stud receiving member having a first longitudinal opening with a predetermined axis for receiving a portion of a traction stud therein; and forming a mounting head, integral with said stud receiving member, with at least one rod receiving aperture therethrough extending transversely to said predetermined axis, adapted to be slidably received on the reinforcing rod;

said step of forming said stud receiving member including the step of forming a stud receiving cylinder and the step of internally threading said stud receiving cylinder to provide a threaded stud receiving opening adapted to threadedly receive said portion of said traction stud;

said step of forming said stud receiving cylinder including the step of drawing and punching a first portion of a blank of material prior to said threading step to provide said cylinder;

said step of forming said mounting head including the step of providing oppositely extending flanges in a second portion of said blank of material with an inner end thereof integrally coupled to one end of said cylinder and an outer end.

21. A method of manufacturing a one-piece traction stud mount adapted for mounting on a reinforcing rod, having a predetermined cross-sectional shape, which may be subsequently embedded in an endless resilient drive belt, comprising the steps of:

forming a longitudinally extending cylindrical stud receiving member, of substantially uniform breadth throughout its length, having a first longitudinal opening with a predetermined axis for receiving a portion of a traction stud therein; and forming a mounting head, integral with said stud receiving member, with at least one rod receiving aperture therethrough extending transversely to said predetermined axis, adapted to be slidably received on the reinforcing rod.

22. The method of manufacturing set forth in claim 21 wherein said step of forming said stud receiving member includes the step of forming a right circular stud receiving cylinder and the step of internally threading said stud receiving cylinder to provide a threaded stud receiving opening adapted to threadedly receive said portion of said traction stud.

23. The method of manufacturing set forth in claim 16 wherein said step of forming said mounting head includes the step of forming a transversely extending rod receiving member with a length substantially greater than said predetermined breadth; and cantileverly supporting transversely opposite terminal ends of and rod receiving member on said stud receiving member.

24. A method of manufacturing a one-piece traction stud mount adapted for mounting on a reinforcing rod, having a predetermined cross-sectional shape, which may be subsequently embedded in an endless resilient drive belt, comprising the steps of:

forming a longitudinally extending stud receiving member having a first longitudinal opening with a predetermined axis for receiving a portion of a traction stud therein; and forming a mounting head, integral with said stud receiving member, with at least one rod receiving aperture therethrough extending transversely to said predetermined axis, adapted to be slidably received on a reinforcing rod;

said step of forming said stud receiving member includes the step of forming a stud receiving cylinder and the step of internally threading said stud receiving cylinder to provide a threaded stud receiving opening adapted to threadedly receive said portion of said traction stud;

said step of forming said mounting head including the step of providing oppositely extending flanges having an inner end thereof integrally coupled to said stud receiving member and an outer end and displacing said outer end relative to said inner end in a direction away from said stud receiving member.

25. A method of manufacturing a studded snowmobile drive track having a plurality of reinforcing bars embedded in an endless resilient belt and a plurality of traction stud mounts on said bars, said belt including an outer drive surface and an inner surface, said method comprising the steps of:

forming a plurality of stud mounts each with a stud mounting receptacle having a stud receiving passage therein for receiving a portion of a traction stud and an integral mounting head with a mounting passage therein disposed transverse to said stud mounting receptacle for receiving a reinforcing bar adapted to be embedded in a resilient drive track;

coupling a plurality of said stud mounting receptacles to a plurality of reinforcing rods so that said rods are received in said mounting passages; and embedding said rods and at least a portion of each of said stud mounting heads in an endless band of resilient material with said stud receiving passages being disposed adjacent the outer surface of said track for detachably mounting a traction stud in each of said stud receiving passages;

said forming step for forming each stud mounting receptacle including the step of displacing and punching a stud receiving cylinder in a first portion of a blank of material which is integral with a second portion of said blank of material having an inner flange portion defining a base integral with said cylinder and a pair of confronting legs integral with said base.

26. A method of manufacturing a studded snowmobile drive track having a plurality of reinforcing bars embedded in an endless resilient belt and a plurality of traction stud mounts on said bars, said belt including an outer drive surface and an inner surface, said method comprising the steps of:

forming a plurality of stud mounts each with a stud mounting receptacle having a stud receiving passage therein for receiving a portion of a traction stud and an integral mounting head with a mounting passage therein disposed transverse to said stud mounting receptacle for receiving a reinforcing bar adapted to be embedded in a resilient drive track;

coupling a plurality of said stud mounting receptacles to a plurality of reinforcing rods so that said rods are received in said mounting passages;

embedding said rods and at least a portion of each of said stud mounting heads in an endless band of resilient material with said stud receiving passages being disposed adjacent the outer surface of said track for detachably mounting a traction stud in each of said stud receiving passages, said embedding step including forming a plurality of window openings in said endless band of resilient material to provide passages for snow to pass therethrough, and mounting guide clips on portions of said track adjacent said windows for slidingly receiving a guide track;

said coupling step including the step of placing stud mounts on said reinforcing rod in such positions as to be disposed in said portions of said resilient material adjacent said windows.

27. A method of manufacturing a studded snowmobile drive track having a plurality of reinforcing bars embedded in an endless resilient belt and a plurality of traction stud mounts on said bars, said belt including an outer drive surface and an inner surface, said method comprising the steps of:

forming a plurality of stud mounts each with a stud mounting receptacle having a stud receiving passage therein for receiving a portion of a traction stud and an integral mounting head with a mounting passage therein disposed transverse to said stud mounting receptacle for receiving a reinforcing bar adapted to be embedded in a resilient drive track;

coupling a plurality of said stud mounting receptacles to a plurality of reinforcing rods so that said rods are received in said mounting passages; and embedding said rods and at least a portion of each of said stud mounting heads in an endless band of resilient material with said stud receiving passages being disposed adjacent the outer surface of said track for detachably mounting a traction stud in each of said stud receiving passages; and disposing said stud mounting receptacles in a plurality of apertures provided in a web of reinforcing material prior to said embedding step;

said embedding step including the step of embedding said web of reinforcing material in said endless band.

28. A method of manufacturing a one-piece traction stud mount for detachably mounting on a reinforcing rod having a predetermined cross-sectional outline adapted to be embedded in a yieldable drive track comprising the steps of:

selecting a blank of material;

forming a portion of said blank into a transversely disposed stud receiving receptacle having a stud receiving passage therein for detachably receiving a traction stud; and forming another integral portion of said blank, integral with said stud receiving receptacle, into a mounting head having a rod receiving passage therethrough, transverse to said stud receiving passage, for receiving said reinforcing rod;

said step of forming another integral portion of said blank into said mounting head including the step of forming a pair of flanges extending from an end of the stud receiving receptacle.

29. A method of manufacturing a studded snowmobile drive track having a plurality of reinforcing bars embedded in an endless resilient belt and a plurality of traction stud mounts on said bars, said belt including an outer drive surface and an inner surface, said method comprising the steps of:

forming a plurality of stud mounts each with a stud mounting receptacle of substantially uniform breadth throughout its length, having a stud receiving passage therein for receiving a portion of a traction stud, and an integral mounting head with a transversely extending mounting passage therein disposed transverse to said stud mounting receptacle for receiving a reinforcing bar adapted to be embedded in a resilient drive track;

coupling a plurality of said stud mounting receptacles to a plurality of reinforcing rods so that said rods are received in said mounting passages; and embedding said rods and at least a portion of each of said stud mounting heads in an endless band of resilient material with said stud receiving passages being disposed adjacent the outer surface of said track for detachably mounting a traction stud in each of said stud receiving passages;

said step of forming a plurality of stud mounts including the step of forming said receptacle as a thin-walled elongate annular cylinder and forming said integral mounting head as a thin-walled transversely extending base integral with said cylinder and including a pair of confronting thin-wall legs integral with said base.

30. A method of mounting a plurality of traction studs, each having a threaded mounting end and an opposite ground engaging end to an endless resilient snowmobile drive track, having a plurality of reinforcing rods embedded therein, comprising the steps of forming a plurality of one-piece stud mounts, each having an elongate stud receiving receptacle provided with a stud receiving passage therein and an integral, transversely disposed rod receiving receptacle having a rod receiving passage therein for receiving said reinforcing rod;

aligning said rod receiving passage in each of said stud mounts with selected ones of said rods;

sliding said stud mounts onto said selected ones of said rods into selected predetermined positions thereon;

embedding said rods and at least a portion of each of said rod receiving receptacles in resilient material to yieldably hold the stud mounts in said predetermined positions; and threadedly mounting said threaded mounting ends of said studs to said stud receiving receptacles;

said step of forming a plurality of stud mounts being accomplished by forming said receptacle as a thin elongate cylindrical wall and forming said rod receiving receptacle as a transversely extending base integral with said cylinder and including a pair of legs integral with said base extending from an end of said stud receiving receptacle.

31. A one-piece device for mounting an elongate traction stud to a laterally extending reinforcing bar, adapted to be embedded in a resilient endless drive track for a snowmobile or the like, said device comprising:

an elongate traction stud receiving receptacle, of substantially uniform breadth throughout its length, for detachably receiving a portion of said traction stud; and mounting head means, integral with said receptacle but extending transversely relative thereto, for receiving said reinforcing bar and mounting said traction stud receiving receptacle thereon.

32. The one piece device set forth in claim 31 wherein said mounting head means includes a bar receiving base of predetermined length which is substantially greater then said uniform breadth.

33. The one piece device set forth in claim 31 wherein said mounting head means includes a bar receiving mount member having opposite terminal ends which are cantileverly supported on said traction stud receiving receptacle.

34. A unitary device for mounting an elongate traction stud to a laterally extending reinforcing bar, adapted to be embedded in a resilient endless drive track for a snowmobile or the like, said device comprising:

an elongate hollow traction stud receiving receptacle including an annular thin side wall of substantially uniform thickness for detachably receiving a portion of said traction stud; and mounting head means, integral with said receptacle but extending transversely relative thereto, for receiving said reinforcing bar and mounting said traction stud receiving receptacle thereon.

35. The unitary device set forth in claim 34 wherein said mounting head means comprises a thin transverse wall having a substantially uniform thickness, extending transversely to said receiving means for mounting on said reinforcing bar.

36. The unitary device set forth in claim 35 wherein said uniform thickness of said stud receiving receptacle is equal to said uniform thickness of said mounting head means.

37. The unitary device set forth in claim 36 wherein said thin wall of said mounting head means comprises a transversely extending cylinder.

38. The unitary device set forth in claim 34 wherein said mounting head means comprises a transverse cylinder having a thin wall of substantially uniform thickness extending transversely to said reinforcing bar.

39. The unitary device set forth in claim 34 wherein said hollow thin sidewall includes inner and outer surfaces spaced apart substantially the same distance throughout the length of the side wall.

40. The unitary device set forth in claim 39 wherein said mounting head means comprises a thin transverse wall with inner and outer surfaces spaced apart substantially the same distance throughout the length of said transverse wall.

41. The unitary device set forth in claim 34 wherein said mounting head means comprises a thin walled transverse cylinder of predetermined transverse length; said transverse cylinder being adapted to conform to the shape of the reinforcing bar, and having a transverse side wall with inner and outer surfaces which are spaced apart substantially the same distance throughout said transverse length.

42. The unitary device set forth in claim 34 wherein said thin sidewall includes inner and outer opposing surfaces portions which are substantially parallel.

43. The unitary device set forth in claim 42 wherein said mounting head means comprises a transverse hollow cylinder having a thin wall provided with inner and outer surfaces which are spaced apart substantially the same distance throughout its length.

44. The unitary device set forth in claim 42 wherein said inner surface includes a threaded portion for threadedly receiving the traction stud.

45. A unitary stud mount for mounting a traction stud to a laterally extending reinforcing rod, having a predetermined transverse outline and adapted to be embedded in an endless resilient drive belt, said stud mount comprising:

longitudinally extending, stud receiving means, having a first longitudinal opening with a longitudinal axis therein, for detachably receiving a portion of a traction stud; and mounting head means, adapted to be embedded in said drive belt, integrally coupled to said stud receiving means and extending transversely to said stud receiving means, for mounting said stud receiving means on said reinforcing rod;

said stud receiving means comprising a thin sidewall of predetermined length and of substantially uniform radial thickness.

46. The stud mount set forth in claim 45 wherein said side wall includes radially inner and outer opposing sidewall surface portions which are radially spaced apart substantially a first predetermined distance throughout said predetermined length of said thin sidewall.

47. The stud mount set forth in claim 46 wherein said mounting head means includes a transversely extending thin sidewall having a predetermined transverse length and inner and outer spaced apart transverse surfaces which are uniformly spaced apart throughout said transverse length.

48. The stud mount set forth in claim 46 wherein said mounting head means includes a transversely extending, thin wall cylinder having a thin sidewall of a predetermined transverse length, with inner and outer surfaces which are spaced apart substantially a second predetermined distance throughout said predetermined transverse length.

49. The stud mounting set forth in claim 48 wherein said first predetermined distance which said inner and outer sidewall surfaces of said stud receiving means are spaced apart and said second predetermined distance which said inner and outer surfaces of said mounting head means are spaced apart are substantially equal.

50. A method of manufacturing a unitary traction stud mount adapted for mounting on a reinforcing rod, having a predetermined cross-sectional shape, which may be subsequently embedded in an endless resilient drive belt, comprising the steps of:

forming a longitudinally extending stud receiving member having a first longitudinal opening with a predetermined axis for receiving a portion of a traction stud therein; and forming a transverse mounting head, integral with said stud receiving member, with at least one rod receiving aperture therethrough extending transversely to said predetermined axis, adapted to be slidably received on a reinforcing rod;

said step of forming said stud receiving member comprising the step of forming a thin hollow sidewall having a predetermined length and inner and outer opposing surfaces which are spaced apart a first predetermined distance throughout said predetermined length.

51. The method set forth in claim 50 wherein said step of forming said mounting head comprises the step of forming a thin transverse sidewall having a predetermined transverse length and inner and outer transversely extending surfaces which are spaced apart a second predetermined distance throughout said transverse length.

52. The method set forth in claim 51 wherein said step of forming and mounting head is accomplished by forming said second predetermined distance equal to said first predetermined distance.

53. The method set forth in claim 50 wherein said step of forming said mounting head comprises the step of forming a hollow transverse cylinder having a transverse cylindrical sidewall of predetermined transverse length and inner and outer transversely extending surfaces which are spaced apart a second predetermined distance throughout said transverse length.

54. A method of manufacturing a unitary traction stud mount adapted for mounting on a reinforcing rod, having a predetermined cross-sectional shape, which may be subsequently embedded in an endless resilient drive belt, comprising the steps of:

forming a longitudinally extending stud receiving member having a first longitudinal opening with a predetermined axis for receiving a portion of a traction stud therein; and forming a transverse mounting head, integral with said stud receiving member, with at least one rod receiving aperture therethrough extending transversely to said predetermined axis, adapted to be slidably received on a reinforcing rod;

said step of forming said stud receiving member comprising the step of forming a thin sidewall of predetermined length and a first substantially uniform radial thickness.

55. The method set forth in claim 54 wherein said step of forming a longitudinally extending mounting head is accomplished by forming a thin transverse sidewall having a predetermined transverse length of a second substantially uniform thickness.

56. The method set forth in claim 55 wherein said first and second thickness are substantially equal.

57. The method set forth in claim 54 wherein said step of forming said mounting head is accomplished by forming a hollow transverse cylinder having a transversely extending cylindrical sidewall of predetermined transverse length and of substantially uniform thickness throughout said transverse length.

58. A method of manufacturing a studded snowmobile drive track having a plurality of reinforcing bars embedded in an endless resilient belt and a plurality of traction stud mounts on said bars, said belt including an outer drive surface and an inner surface, said method comprising the steps of:

forming a plurality of stud mounts each with
a hollow stud mounting receptacle having an annular sidewall of substantially uniform radial thickness and defining a stud receiving passage therein for receiving a portion of a traction stud and
an integral transverse mounting head with a mounting passage therein disposed transverse to said stud mounting receptacle for receiving one of the reinforcing bars adapted to be embedded in a resilient drive track;

coupling a plurality of said stud mounting receptacles to a plurality of reinforcing rods so that said rods are received in said mounting passages; and embedding said rods and at least a portion of each of said stud mounting heads in an endless band of resilient material with said stud receiving passages being disposed adjacent the outer surface of said track for detachably mounting a traction stud in each of said stud receiving passages.

59. The method set forth in claim 58 wherein said step of forming an integral mounting head includes the step of forming a thin transverse wall having a substantially uniform thickness extending transversely to said annular sidewall.

60. The method set forth in claim 59 wherein said transverse wall and said annual sidewall are of equal thicknesses.

61. The method set forth in claim 58 wherein said step of forming an integral mounting head includes the step of forming a transversely extending cylinder having a sidewall of substantially uniform thickness.

62. The method set forth in claim 58 where said step of forming said integral transverse mounting head comprises the step of forming a thin walled transverse cylinder having a thin transverse sidewall with inner and outer surfaces which are spaced apart substantially the same distance throughout the length of said transverse sidewall.

63. A method of manufacturing a unitary traction stud mount for detachably mounting on a reinforcing rod having a predetermined cross-sectional outline adapted to be embedded in a yieldable drive track comprising the steps of:

selecting a blank of material of substantially uniform thickness;

forming a first portion of said blank into a transversely disposed hollow stud receiving receptacle having an annular sidewall with a first substantially uniform radial thickness defining a stud receiving passage therein for detachably receiving a traction stud; and forming another integral portion of said blank, integral with said stud receiving receptacle, into a transversely extending mounting head having a thin transverse wall, provided with a second substantially uniform thickness, defining a rod receiving passage therethrough, transverse to said stud receiving passage, for receiving said reinforcing rod.

64. The method set forth in claim 63 wherein said first radial thickness and said second substantially uniform thickness are substantially equal.

65. The method set forth in claim 63 wherein said step of forming a thin transverse wall includes the step of forming a hollow transverse cylinder.

66. A method of mounting a plurality of traction studs, each having a threaded mounting end and an opposite ground engaging end to an endless resilient snowmobile drive track, having a plurality of reinforcing rods embedded therein, comprising the steps of forming a plurality of one-piece stud mounts, each having an elongate stud receiving receptacle having an annular sidewall of substantially uniform radial thickness provided with a stud receiving passage therein and an integral, transversely disposed rod receiving receptacle having a rod receiving passage therein for receiving said reinforcing rod;

aligning said rod receiving passage in each of said stud mounts with selected ones of said rods;

sliding said stud mounts onto said selected ones of said rods into selected predetermined positions thereon;

embedding said rods and at least a portion of each of said rod receiving receptacles in resilient material to yieldably bold the stud mounts in said predetermined positions; and threadedly mounting said threaded mounting ends of said studs to said stud receiving receptacles.

67. The method of mounting set forth in claim 66 wherein said forming step is accomplished by folding a blank of material on itself to provide a pair of confronting legs coupled together at one hinge end and having opposing free ends, forming said stud receiving receptacle, which are spreadable relative to each other and to said hinge end when a traction stud is threadedly coupled thereto; said embedding step including the step of molding resilient material on laterally outer sides of said legs to yieldably hold said free ends together but allowing spreading movement thereof to spread positions when a traction stud is mounted therein.

68. The stud mount set forth in claim 1 wherein said mounting head means comprises a non-circular opening extending therethrough substantially perpendicular to said longitudinal axis.

69. The stud mount set forth in claim 1 wherein said mounting head means comprises a hollow band, integral with said stud receiving means, having a second opening therein, and extending transversely to said first opening, for being snugly received on said reinforcing rod.

70. The stud mount set forth in claim 69 wherein said second opening has an outline shaped complemental to said transverse outline of said rod.

71. The stud mount set forth in claim 31 wherein said mounting head means includes a transverse opening therein having an outline shaped complementally to said predetermined transverse outline of said reinforcing rod for mating therewith.

72. The stud mount set forth in claim 71 wherein said mounting head means comprises a hollow band integrally coupled to said stud receiving means and defining said transverse opening therein extending transversely to said first opening for being received on said reinforcing rod.

73. The stud mount set forth in claim 72 wherein said hollow band comprises a hollow elongate cylinder having a sidewall extending normal to said stud receiving means.

74. The stud mount set forth in claim 3 wherein said mount means is integral with said stud receiving means and includes a pair of confronting flanges each including an opening therein for receiving said rod.

75. The stud mount set forth in claim 74 wherein said flanges each include a transversely extending ear integral with the flange adjacent said opening therein for bearing against said rod.

76. The stud mount set forth in claim 75 wherein said flanges are generally parallel to each other and said ears extend normal to said flanges.

77. The stud set forth in claim 75 wherein said openings in said flanges are spaced apart.

78. The stud mount set forth in claim 1 wherein said outer portions of said flanges include terminal ends which are coupled together and cooperate to define a hollow rod mounting cylinder including an opening therein extending transverse to said first longitudinal opening.

79. The stud mount set forth in claim 1 wherein said outer portions each include an aperture therethrough for receiving said rod; said aperture having a shape complemental to the outline of said rod to snugly receive said rod.

80. The stud mount set forth in claim 79 including an ear integral with each of said outer portions and extending transversely to said outer portions adjacent said aperture for bearing against said rod to rigidify said mount means.

81. The stud mount set forth in claim 1 wherein said inner portions are perpendicular to said cylinder and said outer portions are perpendicular to said inner portions.

82. The stud mount set forth in claim 78 wherein said rod mounting cylinder is substantially perpendicular to said stud mounting cylinder.

83. The stud mount set forth in claim 3 wherein said stud receiving means comprises a barrel; said mounting head means being generally U-shaped and including a base integral with said barrel and a pair of confronting legs integral with said base; each of said legs including an aperture therethrough for receiving said rod.

84. The stud mount set forth in claim 83 wherein said legs each include an integral ear adjacent said opening therein and disposed generally perpendicular thereto for bearing against said rod.

85. The stud mount set forth in claim 84 wherein said aperture is generally semi-cylindrical in shape.

86. The stud mount set forth in claim 19 wherein said outer end portions are disposed in confronting relation with each other and coupled together to form a cylinder transverse to said stud mounting means; and said cylinder defining a passage with a second axis transverse to said first axis.

87. The stud mount set forth in claim 86 wherein said passage has a shape complemental to the predetermined shape of said reinforcing bar.

88. The stud mount set forth in claim 19 wherein said outer end portions are spaced apart and each includes an aperture therein complemental to said predetermined shape of said rod.

89. The stud mount set forth in claim 88 wherein said inner end portions are generally perpendicular to said outer end portions, said outer end portions each including an integral ear, adjacent the aperture therein, for bearing against said rod.

90. The stud mount set forth in claim 88 wherein said aperture is semi-cylindrical in shape.

91. The stud mount set forth in claim 19 wherein said mounting head is generally U-shaped and includes a base integral with said cylinder and a pair of confronting legs integral with said base; said aperture comprising a passage through each of said legs for receiving said rod.

92. The combination set forth in claim 14 wherein said stud mounting means comprises a stud mounting cylinder; said mounting head comprises a hollow, rod receiving cylinder transverse to said stud mounting cylinder and including a transverse passage therein for slidably mounting on said rod.

93. The combination set forth in claim 14 wherein said mounting head is U-shaped and includes a base integral with said stud mounting cylinder and a pair of confronting legs integral with said base; said aperture in said base comprising an opening through each of said legs.

94. The combination set forth in claim 93 including a sheet of material, embedded in said belt; said sheet of material having a plurality of locator apertures therein receiving said stud mounting means on one side of said rod; a pair of reinforcing sheets embedded in said belt on an opposite side of said rod; and a plurality of longitudinally extending elongate reinforcing cords sandwiched between said reinforcing sheets.

95. The method of manufacturing set forth in claim 20 wherein said step of forming said stud receiving member includes the step of forming a stud receiving cylinder and the step of internally threading said stud receiving cylinder to provide a threaded stud receiving opening adapted to threadedly receive said portion of said traction stud.

96. The method of manufacturing set forth in claim 20 wherein said step of forming said mounting head includes the step of displacing said outer end relative to said inner end in a direction away from said stud receiving cylinder.

97. The method of manufacturing set forth in claim 96 wherein said displacing step is accomplished by folding said outer ends of said oppositely extending flange into a shape defining said mounting aperture which is complemental to said predetermined shape of said rod.

98. The method of manufacturing set forth in claim 97 wherein said folding step includes the step of disposing said outer ends of said flanges into abutting relation and welding said second ends together; and sliding said head onto said reinforcing rod.

99. The method of manufacturing set forth in claim 20 wherein said step of forming said stud is receiving member comprises the step of winding a single length of material into a tightly would spiral coil defining said first longitudinal opening.

100. The method of manufacturing set forth in claim 99 wherein said step of forming said mounting head includes the steps of forming an endmost mounting loop in said single length of material transverse to, but integral with, an inner end portion of said coil to define said rod receiving aperture.

101. The method of manufacturing set forth in claim 20 including the step of severing said outer ends along an outline to provide said mounting aperture which has a shape conforming to at least a portion said predetermined cross-sectional shape.

102. The method of manufacturing set forth in claim 101 wherein said severing step includes the step of forming a tab supported in the plane of said outer ends of said flanges in said mounting aperture and then displacing said tab out of said plane to a transversely disposed, cantileverly supported position adjacent said mounting aperture.

103. The method of manufacturing set forth in claim 102 including the step of disposing said outer ends adjacent said rod with said mounting apertures aligned with said rod and then relatively moving said stud mount and said rod so that said rod is received in said mounting apertures and said tabs bear against said rod.

104. The method of manufacturing set forth in claim 20 wherein said step of forming said head includes the step of bending said flanges into a U-shape having a base at said inner ends of said flange and a pair of confronting legs on said base providing said outer ends of said flanges.

105. The method of manufacturing set forth in claim 104 wherein said step of bending further includes the step of continuing to displace said legs to conform to said predetermined shape of said rod and the terminal ends of said legs are disposed in abutting relation.

106. The method of manufacturing set forth in claim 104 wherein said step of forming said head includes the step of cutting an aperture in each of said flanges to define said mounting aperture which has an outline conforming, at least in part, to said predetermined shape of said rod.

107. The method of manufacturing set forth in claim 106 wherein said step of cutting includes the step of allowing a portion of the material initially disposed in said mounting aperture to remain integrally coupled to said outer portion to form a cantileverly supported tab disposed in the plane of said outer portion, and including the step of displacing said tab out of said place to a transverse position adjacent said mounting aperture.

108. The method of manufacture set forth in claim 107 including the step of sliding said outer ends of said flanges onto said mounting rod which is received by said mounting apertures and said displaced tabs bear against said rod.

109. The method set forth in claim 108 further including the step of embedding said rod and said stud mount in resilient material.

110. The method of manufacture set forth in claim 108 including the step of molding a resilient belt around said rod and at least a portion of said stud mount.

111. The method set forth in claim 20 wherein said step of forming a mounting head includes the step of cutting a pair of rod mounting apertures, each having a shape complemental to said predetermined cross-sectional shape of said rod, in spaced apart relation intermediate integrally coupled, hinge portions provided in a sheet of material having opposite free end portions; and folding said sheet of material to dispose said intermediate hinge portions into confronting relation and said rod receiving apertures into alignment with each other.

112. The method set forth in claim 111 wherein said cutting step is accomplished by severing said sheet of material along two separate lines to define two separate tabs in the plane of said sheet of material each having a free end in the plane of said sheet and an opposite end integrally coupled to said sheet of material and bending said free ends of said tabs out of the plane of said sheet of material and disposing said free ends adjacent said rod mounting apertures to positions substantially normal to the plane of said sheet of material.

113. The method set forth in claim 112 wherein said step of forming said longitudinally extending stud receiving member is accomplished by displacing terminal end portions of said opposite free end portions out of the planes of said sheet of material into arcuate, traction stud receiving portions before said folding step is accomplished; said folding step including the step of disposing said arcuate traction stud receiving portions in confronting relation with each other.

114. The method set forth in claim 113 including the step of cutting a plurality of longitudinally spaced apart apertures in said arcuate traction stud receiving portions prior to said folding step.

115. The method of manufacturing set forth in claim 25 wherein said forming step includes the step of displacing said legs to conform to the outline of said rod and welding the terminal ends of said legs together.

116. The method of manufacturing set forth in claim 25 wherein said forming step includes the step of forming said mounting passage in each of said legs having an outline which, at least in part, conforms to the outline of said rod and said mounting step includes aligning said mounting passage in said legs with each other and then slidably disposing said rod within said apertures.

117. The method of manufacturing set forth in claim 25 wherein said step of forming each of said stud mounts with a mounting passage therein is accomplished by cutting a pair of rod mounting apertures, each having a shape complemental to the cross-sectional shape of said rod, in spaced apart relation in a mid-portion of a sheet of material having opposite free ends, said mid-portion being integral with said stud receiving member, and folding said sheet of material along said mid-portion between said apertures to dispose said rod receiving apertures into alignment with each other.

118. The method of manufacturing set forth in claim 117 wherein said cutting step is accomplished by severing said sheet of material along two lines to define two separate tabs in the plane of said sheet of material; each of said tabs having a cantileverly supported end in the plane of said sheet and an opposite end integrally coupled to said sheet of material, and bending said cantileverly supported ends of said tabs out of the plane of said sheet of material and disposing them adjacent said rod mounting apertures to positions substantially normal to the plane of said sheet of material.

119. The method set forth in claim 118 wherein said step of forming said longitudinally extending stud receiving member is accomplished by displacing terminal end portions of said opposite free ends out of the planes of said sheet of material into arcuately shaped, stud receiving portions before said folding step is accomplished; said folding step including the step of disposing said arcuate traction stud receiving portions in confronting relation with each other; cutting a plurality of longitudinally spaced apart recesses in said arcuate traction stud receiving portions prior to said bending step, and disposing portions of said traction stud in said plurality of apertures and turning said studs to threadedly couple said traction studs to said stud mounting receptacle.

120. The method of manufacturing set forth in claim 28 wherein said step of forming said mounting head includes the step of conforming said flanges to the outline of said rod with the terminal ends of said flanges in confronting relation to form said rod receiving passage.

121. The method of manufacturing set forth in claim 120 wherein said step of forming said mounting head includes the step of welding said terminal ends of said flanges together.

122. The method set forth in claim 28 wherein said step of forming said mounting head includes the step of bending the terminal end portion of said flanges into generally parallel, spaced apart legs generally parallel to said stud receiving passage.

123. The method of manufacturing set forth in claim 122 wherein said step of forming said mounting head includes the step of cutting each of said legs to form, at least in part, a portion of said stud receiving passage and provide a cantileverly supported tab in the plane of said leg.

124. The method of manufacturing set forth in claim 123 wherein said step of forming said mounting head includes the step of displacing said tab out of said plane to a position generally perpendicular to said leg for bearing against said rod.

125. The method of manufacturing set forth in claim 28 wherein said step of forming another integral portion of said blank into a mounting head having a rod receiving passage therethrough is accomplished by cutting a pair of spaced apart rod mounting apertures, each having an outline which is complementally formed to the outline of said rod, in said blank of material, and bending said blank of material to dispose said rod receiving apertures into alignment with each other.

126. The method of manufacturing set forth in claim 125 wherein said cutting step is accomplished by severing said sheet of material along two lines to define two separate tabs in the plane of said blank of material each having a free end in the plane of said sheet and an opposite end integrally coupled to said blank of material; and bending said free ends of said tabs out of the plane of said blank of material and disposing them adjacent said rod mounting apertures to positions substantially normal to the plane of said blank of material.

127. The method of manufacturing set forth in claim 126 wherein said step of forming said longitudinally extending stud receiving member is accomplished by displacing terminal end portions of said free ends out of the planes of said blank of material into arcuately shaped stud receiving portions before said folding step is accomplished; said folding step including the step of disposing said arcuate traction stud receiving portions in confronting relation with each other.

128. The method set forth in claim 127 including the step of cutting a plurality of longitudinally spaced apart recesses in said arcuately shaped stud receiving portions prior to said folding step for receiving the threads of a traction stud after said folding step is accomplished.

129. A one-piece stud mount, adapted to be at least partially embedded in an endless resilient drive belt, for mounting a traction stud to a reinforcing rod of a predetermined shape and adapted to be embedded in said endless resilient belt, said stud mount comprising:

first and second confronting strips each having first and second ends;

said first ends including aligned openings, having a first axis, for receiving said reinforcing rod therein; and said second ends including stud receiving receptacle means, having a longitudinal stud receiving opening with a longitudinal axis extending transversely to said first axis, for detachably receiving a traction stud.

130. The stud mount set forth in claim 129 wherein said first and second strips each includes a stabilizing flange integral therewith but extending generally perpendicular thereto adjacent said opening therein for bearing against said rod.

131. The stud mount set forth in claim 130 wherein said first and second strips are spaced apart.

132. The stud mount set forth in claim 129 wherein said stud receiving receptacle means comprises an integral longitudinally extending, internally threaded cylinder.

133. The stud mount set forth in claim 130 wherein said second ends of said first and second strips are integrally coupled together.

134. The stud mount set forth in claim 130 wherein said stabilizing flanges are integral with said first ends of said first and second strips extending parallel to said first axis for bearing against said reinforcing rod.

135. The stud mount set forth in claim 134 wherein said second ends of said first and second legs are free for spreading movement relative to each other as said traction stud is received therein.

136. The stud mount set forth in claim 130 wherein said first ends of said confronting strips are integrally coupled said second ends are moveable relative to each other; said stud receiving receptacle means including confronting arcuate stud receiving portions of said second ends which displaced in opposite directions relative to each other for defining said stud receiving opening.

137. The stud mount set forth in claim 136 wherein said arcuate stud receiving portions include a plurality of longitudinally spaced apart thread defining openings therein to define screw threads for receiving portions of said traction stud therein.

138. The stud mount set forth in claim 129 wherein said first ends of said first and second strips are integrally coupled together and said second ends are free and spreadable relative to each other and to said first ends as a traction stud is received by said stud receiving means.

139. The stud mount set forth in claim 138 wherein said stud receiving receptacle means comprises elongate, confronting arcuate portions of said second ends relatively displaced in opposite directions to define said longitudinal opening.

140. The stud mount set forth in claim 139 wherein said confronting arcuate portions each includes a plurality of longitudinally spaced thread defining openings for receiving portions of said traction stud.

141. A one-piece stud mount, adapted to being embedded in an endless resilient track, for mounting a traction stud to a reinforcing rod which is also adapted to being embedded in said track and having a predetermined shape, said stud mount comprising:

a blank of material folded on itself to provide a pair of confronting legs having adjacent hinge ends integrally coupled together and opposing, free ends which are spreadable relative to each other and to said hinge ends;

said free ends having longitudinally extending, stud receiving opposed passage means therebetween defining a first longitudinal opening with a longitudinal axis for detachably receiving a traction stud;

said hinge ends including integral mount means extending transversely of said stud receiving means for mounting said stud receiving means on said rod.

142. The stud mount set forth in claim 141 wherein said legs are generally disposed in predetermined planes and said opposed passage means comprises arcuate portions in each of said legs displaced in opposite direction out of the planes of said legs for receiving opposite sides of a traction stud therebetween.

143. The stud mount set forth in claim 142 including a plurality of longitudinally spaced, thread receiving openings in each of said arcuate portions for receiving portions of said traction stud.

144. The stud mount set forth in claim 143 wherein said mount means includes a transverse opening in each of said legs aligned with the other opening in the other of said legs for receiving said reinforcing rod therein, said mount means further including an ear integral with each of said legs adjacent the transverse opening therein for bearing against said reinforcing rod.

145. The stud mount set forth in claim 144 wherein said ear includes an outline which is complemental to the outline of said transverse opening.

146. The method of mounting set forth in claim 30 wherein said forming step is accomplished by folding a blank of material on itself to provide a pair of confronting legs coupled together at one hinge end and having opposing free ends, forming said stud receiving receptacle, which are spreadable relative to each other and to said hinge end when a traction stud is threadedly coupled thereto; said embedding step including the step of molding resilient material on laterally outer sides of said legs to yieldably hold said free ends together but allowing spreading movement thereof to spread positions when a traction stud is mounted therein.

147. A method of assembling a traction stud mount on a reinforcing rod, having a predetermined outline and an axis, adapted to be embedded in a resilient endless drive track comprising the steps of:

selecting a planar blank of material, having a pair of free ends;

cutting a pair of rod receiving openings, each having an outline complemental to said predetermined outline, in spaced apart portions intermediate said ends of said blank of material;

folding said blank of material on itself to form said traction stud mount including a pair of legs having free ends disposed in confronting relation to provide an elongate passage for receiving said traction stud therebetween and opposite ends integrally coupled via an integral hinge joint which holds said legs in confronting relation but allows relative spreading movement thereof when a traction stud is disposed therebetween;

said folding step including the step of aligning said openings with each other; and mounting said traction stud mount on said rod with said rod received in said aligned openings.

148. The method set forth in claim 147 wherein said mounting step is accomplished by disposing said aligned openings in registry with an end of said reinforcing rod;

relatively sliding said traction stud mount and said rod to dispose said traction stud mount on said rod.

149. The method set forth in claim 147 wherein said cutting step is accomplished by severing said sheet of material along two lines to define two separate tabs in the plane of said sheet of material each having a free end in the plane of said sheet and an opposite end integrally coupled to said sheet of material, and bending said free ends of said tabs out of said plane and disposing them adjacent said opening therein substantially normal to the plane of said sheet of material to provide a rigidifying member for bearing against said rod.

150. The method set forth in claim 147 including the step of displacing an elongate portion of at least one of said free ends out of the plane of said sheet of material into an arcuate shape to define said elongate passage.

151. The method set forth in claim 147 including the step of displacing elongate portions of said free ends of said legs out of the planes of said sheet of material into an arcuate shape; said folding step including the step of disposing said elongate arcuately shaped portions of said legs into opposing confronting relation with each other to define said elongate passage.

152. The method set forth in claim 151 including the steps of cutting a plurality of longitudinally spaced recesses along the length of said elongate portions of said free ends of said legs to provide screw threads for receiving complemental screw threads on said traction stud.

153. The method set forth in claim 147 including the step of displacing longitudinally spaced portions of said blank extending from said opposite ends of said blank to form a pair of longitudinally extending grooves therein;

said folding step including the step of aligning said grooves to provide an elongate traction stud receiving passage.

154. The method set forth in claim 153 wherein said cutting step is accomplished by severing said sheet of material along two lines to define two separate tabs in the plane of said sheet of material each having a free end in the plane of said sheet and an opposite end integrally coupled to said sheet of material, and bending said free ends of said tabs out of said plane and disposing them adjacent said opening therein substantially normal to the plane of said sheet of material to provide a rigidifying member for bearing against said rod.

155. The method set forth in claim 154 wherein said displacing step is accomplished by displacing longitudinally extending portions of said tabs into an arcuate shape prior to said bending step.

156. The device set forth in claim 31 wherein said mounting head means comprises a generally U-shaped base having a pair of transversely disposed confronting legs having aligned apertures therethrough for receiving said reinforcing bar.

157. The device set forth in claim wherein 156 said mounting head means includes rigidifying tongues cantileverly supported on said legs adjacent said apertures and extending transversely relative to said legs for bearing against said reinforcing bar.

158. The device set forth in claim 31 wherein said elongate traction stud receiving receptacle comprises a coil spring.

159. The device set forth in claim 31 where elongate traction stud receiving receptacle comprises a length of wire wound into a tightly wound coil having an internal elongate passage therein for threadedly receiving a traction stud.

160. The device set forth in claim 159 where said mounting head means includes an integral extension of said wire defining a passage transverse to said integral passage for receiving a reinforcing bar on a drive track.

161. The device set forth in claim 160 wherein said integral extension of said wire forms a coil loop which extends generally transversely to said tightly wound coil.

162. The device set forth in claim 161 wherein said integral extension of said wire includes a first end integral with said coil and a free terminal end disposed in confronting relation therewith and being yieldable relative to said first end thereto for detachably receiving a reinforcing bar therebetween.

* * * * *